(12) United States Patent
Howell et al.

(10) Patent No.: US 7,500,747 B2
(45) Date of Patent: Mar. 10, 2009

(54) EYEGLASSES WITH ELECTRICAL COMPONENTS

(75) Inventors: Thomas A. Howell, Palo Alto, CA (US); David Chao, Saratoga, CA (US); C. Douglass Thomas, Campbell, CA (US); Peter P. Tong, Mountain View, CA (US)

(73) Assignee: IpVenture, Inc., Los Altos, CA (US)

(*) Notice: Subject to any disclaimer, the term of this patent is extended or adjusted under 35 U.S.C. 154(b) by 254 days.

(21) Appl. No.: 11/183,256

(22) Filed: Jul. 15, 2005

(65) Prior Publication Data

US 2006/0023158 A1 Feb. 2, 2006

Related U.S. Application Data

(63) Continuation of application No. 10/964,011, filed on Oct. 12, 2004, now Pat. No. 7,192,136.

(60) Provisional application No. 60/647,836, filed on Jan. 31, 2005, provisional application No. 60/647,826, filed on Jan. 31, 2005, provisional application No. 60/620,238, filed on Oct. 18, 2004, provisional application No. 60/618,107, filed on Oct. 12, 2004, provisional application No. 60/605,191, filed on Aug. 28, 2004, provisional application No. 60/592,045, filed on Jul. 28, 2004, provisional application No. 60/583,169, filed on Jun. 26, 2004, provisional application No. 60/562,798, filed on Apr. 15, 2004, provisional application No. 60/527,565, filed on Dec. 8, 2003, provisional application No. 60/509,631, filed on Oct. 9, 2003.

(51) Int. Cl.
*G02C 1/00* (2006.01)

(52) U.S. Cl. .................................. 351/158; 381/327

(58) Field of Classification Search ................. 351/158; 381/309, 310, 327, 330, 381, FOR. 135; 455/569.1, 575.1, 575.6

See application file for complete search history.

(56) References Cited

U.S. PATENT DOCUMENTS 320,558 A 6/1885 Hull (Continued)

FOREIGN PATENT DOCUMENTS

CN 88203065 11/1988

(Continued)

OTHER PUBLICATIONS

"±1.5g Dual Axis Micromachined Accelerometer",Freescale Semiconductor, Inc., Motorola Semiconductor Technical Data, MMA6260Q, 2004, pp. 1-7.

(Continued)

*Primary Examiner*—Huy K Mai

(57) ABSTRACT

A pair of glasses with one or more electrical components partially or fully embedded in the glasses is disclosed. In one embodiment, a pair of glasses includes a speaker and an electrical connector, both at least partially embedded in the glasses, with the speaker and the connector electrically coupled together by an electrical conductor. In another embodiment, a pair of glasses includes a storage medium and an electrical connector. In yet another embodiment, a pair of glasses includes a speaker, a coder/decoder, a processor and a storage medium. The glasses can serve as a multimedia asset player. In a further embodiment, some of the electrical components are in a base tethered to a pair of glasses. Instead of just receiving signals, in one embodiment, a pair of glasses also has a microphone and a wireless transceiver. In another embodiment, a pair of glasses includes a preference indicator that allows a user to indicate the user's preference regarding, for example, what is being output by the glasses. In yet another embodiment, there can be one or more control knobs on the glasses. In a further embodiment, a pair of glasses includes a camera and electrical components for wireless connection. In yet a further embodiment, a pair of glasses includes a sensor.

25 Claims, 29 Drawing Sheets

U.S. PATENT DOCUMENTS

| | | |
|---|---|---|
| 669,949 A | 3/1901 | Underwood |
| 1,255,265 A | 2/1918 | Zachara |
| 1,917,745 A | 7/1933 | Weiss |
| 2,638,532 A | 5/1953 | Brady |
| 2,794,085 A | 5/1957 | DeAngells |
| 2,904,670 A | 9/1959 | Calmes |
| 3,060,308 A | 10/1962 | Fortuna |
| 3,597,054 A | 8/1971 | Winter |
| 3,710,116 A | 1/1973 | Jubb |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,942,629 A | 7/1990 | Stadlmann |
| 4,985,632 A | 1/1991 | Bianco et al. |
| 5,008,548 A | 4/1991 | Gat |
| 5,020,150 A | 5/1991 | Shannon |
| 5,036,311 A | 7/1991 | Moran et al. |
| 5,050,150 A | 9/1991 | Ikeda |
| 5,093,576 A | 3/1992 | Edmond et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,306,917 A | 4/1994 | Black et al. |
| 5,353,378 A | 10/1994 | Hoffman et al. |
| 5,359,370 A | 10/1994 | Mugnier |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,480 A | 9/1995 | Ryden |
| 5,455,640 A | 10/1995 | Gertsikov |
| 5,457,751 A | 10/1995 | Such |
| 5,500,532 A | 3/1996 | Kozicki |
| D369,167 S | 4/1996 | Hanson et al. |
| 5,513,384 A | 4/1996 | Brennan et al. |
| 5,533,130 A | 7/1996 | Staton |
| 5,581,090 A | 12/1996 | Goudjil |
| 5,589,398 A | 12/1996 | Krause et al. |
| 5,590,417 A | 12/1996 | Rydbeck |
| 5,608,808 A | 3/1997 | da Silva |
| 5,634,201 A | 5/1997 | Mooring |
| 5,686,727 A | 11/1997 | Reenstra et al. |
| 5,694,475 A * | 12/1997 | Boyden ........................ 381/327 |
| 5,715,323 A | 2/1998 | Walker |
| 5,737,436 A | 4/1998 | Boyden et al. |
| 5,900,720 A | 5/1999 | Kallman et al. |
| 5,946,071 A | 8/1999 | Feldman |
| 5,966,746 A | 10/1999 | Reedy et al. |
| 5,980,037 A | 11/1999 | Conway |
| 5,988,812 A | 11/1999 | Wingate |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,115,177 A | 9/2000 | Vossler |
| 6,154,552 A | 11/2000 | Koroljow et al. |
| 6,231,181 B1 | 5/2001 | Swab |
| 6,236,969 B1 | 5/2001 | Ruppert et al. |
| 6,243,578 B1 | 6/2001 | Koike |
| 6,259,367 B1 | 7/2001 | Klein |
| 6,292,213 B1 | 9/2001 | Jones |
| 6,301,367 B1 | 10/2001 | Boyden et al. |
| 6,307,526 B1 | 10/2001 | Mann |
| 6,343,858 B1 | 2/2002 | Zelman |
| 6,349,001 B1 | 2/2002 | Spitzer |
| 6,349,422 B1 | 2/2002 | Schleger et al. |
| 6,409,338 B1 | 6/2002 | Jewell |
| 6,426,719 B1 | 7/2002 | Nagareda et al. |
| 6,478,736 B1 | 11/2002 | Mault |
| 6,506,142 B2 | 1/2003 | Itoh et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,554,763 B1 | 4/2003 | Amano et al. |
| 6,619,799 B1 | 9/2003 | Blum et al. |
| 6,629,076 B1 | 9/2003 | Haken |
| 6,729,726 B2 | 5/2004 | Miller et al. |
| 6,736,759 B1 | 5/2004 | Stubbs et al. |
| 6,764,194 B1 | 7/2004 | Cooper |
| 6,792,401 B1 | 9/2004 | Nigro et al. |
| 6,929,365 B2 | 8/2005 | Swab et al. |
| 7,031,667 B2 | 4/2006 | Horiguchi |
| 7,073,905 B2 | 7/2006 | Da Pra' |
| 7,192,136 B2 | 3/2007 | Howell et al. |
| 7,255,437 B2 | 8/2007 | Howell et al. |
| 7,274,292 B2 | 9/2007 | Velhal et al. |
| 7,312,699 B2 | 12/2007 | Chornenky |
| 7,331,666 B2 | 2/2008 | Swab et al. |
| 7,380,936 B2 | 6/2008 | Howell et al. |
| 7,401,918 B2 | 7/2008 | Howell et al. |
| 7,438,410 B1 | 10/2008 | Howell et al. |
| 2001/0005230 A1 | 6/2001 | Ishikawa |
| 2002/0081982 A1 | 6/2002 | Schwartz et al. |
| 2002/0084990 A1 | 7/2002 | Peterson, III |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0109600 A1 | 8/2002 | Mault et al. |
| 2002/0140899 A1 | 10/2002 | Blum et al. |
| 2002/0197961 A1 * | 12/2002 | Warren ........................ 455/66 |
| 2003/0022690 A1 | 1/2003 | Beyda et al. |
| 2003/0032449 A1 | 2/2003 | Giobbi |
| 2003/0062046 A1 | 4/2003 | Weismann |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0226978 A1 | 12/2003 | Ribi et al. |
| 2004/0000733 A1 | 1/2004 | Swab et al. |
| 2004/0029582 A1 * | 2/2004 | Swab et al. .............. 455/426.1 |
| 2004/0063378 A1 | 4/2004 | Nelson |
| 2004/0096078 A1 | 5/2004 | Lin |
| 2004/0100384 A1 | 5/2004 | Chen et al. |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2005/0067580 A1 | 3/2005 | Fontaine |
| 2005/0213026 A1 | 9/2005 | Da Pra' |
| 2005/0230596 A1 | 10/2005 | Howell et al. |
| 2005/0239502 A1 * | 10/2005 | Swab et al. .............. 455/556.1 |
| 2005/0248717 A1 | 11/2005 | Howell et al. |
| 2005/0248719 A1 | 11/2005 | Howell et al. |
| 2005/0264752 A1 | 12/2005 | Howell et al. |

| | | |
|---|---|---|
| 2006/0001827 A1 | 1/2006 | Howell et al. |
| 2006/0003803 A1 | 1/2006 | Thomas et al. |
| 2007/0030442 A1 | 2/2007 | Howell et al. |
| 2007/0046887 A1 | 3/2007 | Howell et al. |
| 2007/0109491 A1 | 5/2007 | Howell et al. |
| 2007/0186330 A1 | 8/2007 | Howell et al. |
| 2007/0208531 A1 | 9/2007 | Darley et al. |
| 2007/0279584 A1 | 12/2007 | Howell et al. |
| 2008/0068559 A1 | 3/2008 | Howell et al. |

FOREIGN PATENT DOCUMENTS

| | | |
|---|---|---|
| CN | 89214222.7 | 3/1990 |
| CN | 90208199.3 | 11/1990 |
| EP | 1134491 A2 | 9/2001 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| TW | 484711 | 6/2001 |
| WO | WO 97/12205 A1 | 4/1997 |
| WO | WO 99/50706 | 10/1999 |
| WO | WO 02/06881 A2 | 1/2002 |
| WO | WO 03/069394 A1 | 8/2003 |
| WO | WO 03/100368 A1 | 12/2003 |
| WO | WO 2004/012477 A2 | 2/2004 |
| WO | WO 2004/025554 A1 | 3/2004 |

OTHER PUBLICATIONS

"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardio Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Eyetop", Product-Features, eyetop eyewear, eyetop belt worn, http://www.eyetop.net/products/eyetop/features.asp., downloaded Nov. 6, 2003, pp. 1-2.
"Exclusive Media Event Marks Debut of Oakley Thump: World's First Digital Audio Eyewear", Oakley Investor Relations, Press Release, Nov. 15, 2004, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Compounds Gifts.com, http://www.e-corporategifts.com/sr353.html, downloaded Jan. 22, 2005, pp. 1-2.
"Sun UV ™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 6, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 5, 2005.
"With Racing Heart", Skaloud et al, GPS World, Oct. 1, 2001, http://www.gpsworld.com/gpsworld/content/printContentPopup.Isp?id=1805, pp. 1-5.
Abrisa Product Information: Cold Mirrors, Abrisa, date unknown, p. 1.
Abrisa Product Information: Commercial Hot Mirror, Abrisa, date unknown, p. 1.
Alps Spectable, Air Coduction Glass, Bone Conduction Glass, htt;://www.alps-inter.com/spec.htm, downloaded Dec. 10, 2003, pp. 1-2.
Altlmeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump Into the Consumer Goods Market", Sensors Online, http://www.sensorsmag.com, Aug. 2004.
Cool Last Minute Gift Ideasl, UltimateFatBurner Reviews and Articles, http://www.ultimatefatburner.com/gift-Ideas.html, downloaded May 10, 2005, pp. 1-3.
Comfees.com, Adjustable Sports Band Style No. 1243, http://shop.yahoo.com/comfees/adsporbansty.html, downloaded Apr. 18, 2003, pp. 1-2.
Dixen, Brian, "ear-catching", Supertesten, Mobil, date unknown, pp. 37-41.
Global Solar UV Index, A Practical Guide, World Health Organization, 2002, pp. 1-28.
Grobart, Sam, "Digit-Sizing Your Computer Data", News Article, September, 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-38851.php, pp. 1-3.
Niwa, "UV Index Information", http://www.nlwa.cri.nz/services/uvozone/uv1-Info, downloaded Jul. 15, 2004, pp. 1-2.
Pärkkä, Juhn, et al., "A Wireless Wellness Monitor for Personal Weight Management", VTT Information Techonolgy, Tampere, Finland, date unknown, p. 1.
Pedometer, Model HJ-112, Omron Instruction Manual, Omron Healthcare, Inc., 2003, pp. 1-27.
PNY Announces Executive Attaché USB 2.0 Flash Drive and Pan Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http:/www.pedometer.com, downloaded May 5, 2005.

RazrWire, Motorola, 2005, 1 page.

SafeSun Personal UV Meter, Scientific Data, Optix Tech Inc., http://www.safesun.com/scientific.html, downloaded May 1, 2003, pp. 1-3.

SafeSun Sensor, User's Manual, Optix Tech Inc., date unknown.

SafeSun, Personal UV Meter, "Technical Specifications", Optix Tech Inc., http://www.safesun.com/technical.html, downloaded Jul. 12, 2004, pp. 1-2.

SafeSun, Personal UV Meter, Experiments, Optix Tech Inc., http://www.safesun.com/experimentals.html, downloaded Feb. 5, 2004, pp. 1-2.

Shades of Fun, Blinking Light Glasses, http://www.shadesoffun.com/Nov/Novpgs-14.html, downloaded Jul. 9, 2005, pp. 1-4.

Sportline Fitness Pedometer-Model 360, UltimateFatBurner Superstore, http://www.ultimatefatburner-store.com/ac_004.html, downloaded May 10, 2005, pp. 1-2.

Steele, Bonnie G. et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.

Stevens, Kathy, "Should I Use a Pedometer When I Walk?", Healtheon/WebMD, Apr. 14, 2000.

Sundgot, Jørgen "2nd-gen Motorola Bluetooth headset", InfoSync World, Mar. 1, 2003, http://www.infosync.no/news/2002/n/2841.html, pp. 1-2.

SunSensors, Segan Industries, Inc., http://www.segan-ind.com/sunsensor.htm, downloaded Feb. 5, 2004, pp. 1-3.

SunUV™, Personal UV Monitor, APA Optics, Inc., http://www.apaoptics.com/sunuv/models.html, downloaded Dec. 20, 2003.

SunUV™, Personal UV Monitor User's Guide, APA Optics, Inc., 2003 pp. 1-52.

Talking Pedometer, Sportline, Inc., date unknown.

Top Silicon PIN Photodiode, PD93-21C, Technical Data Sheet, Everlight Electronics Co., Ltd., 2004, pp. 1-9.

UV Light Meter, UVA and UVB measurement, UV-340, Instruction Manual, Lutron, date unknown, pp. 1-5.

UV-Smart, UVA/B Monitor, Model EC-960-PW, Instruction Manual, Tanita Corporation of America, Inc., downloaded Nov. 16, 2001.

Vitaminder Personal Carb Counter with Convenient Key Chain, date unknown, pp. 1-4.

* cited by examiner

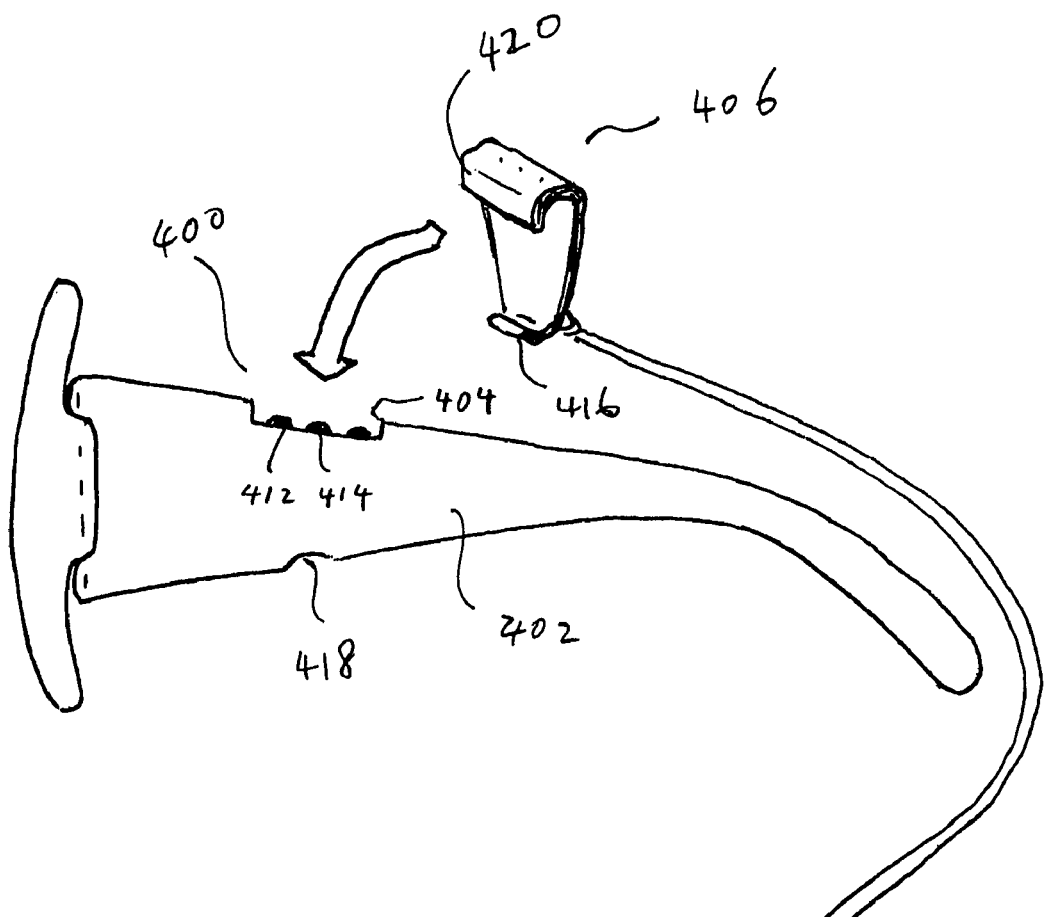
FIG. 7
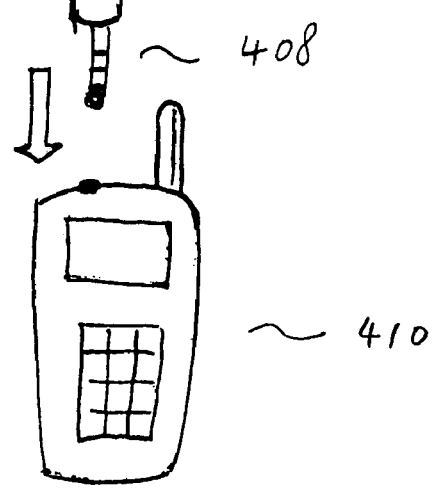

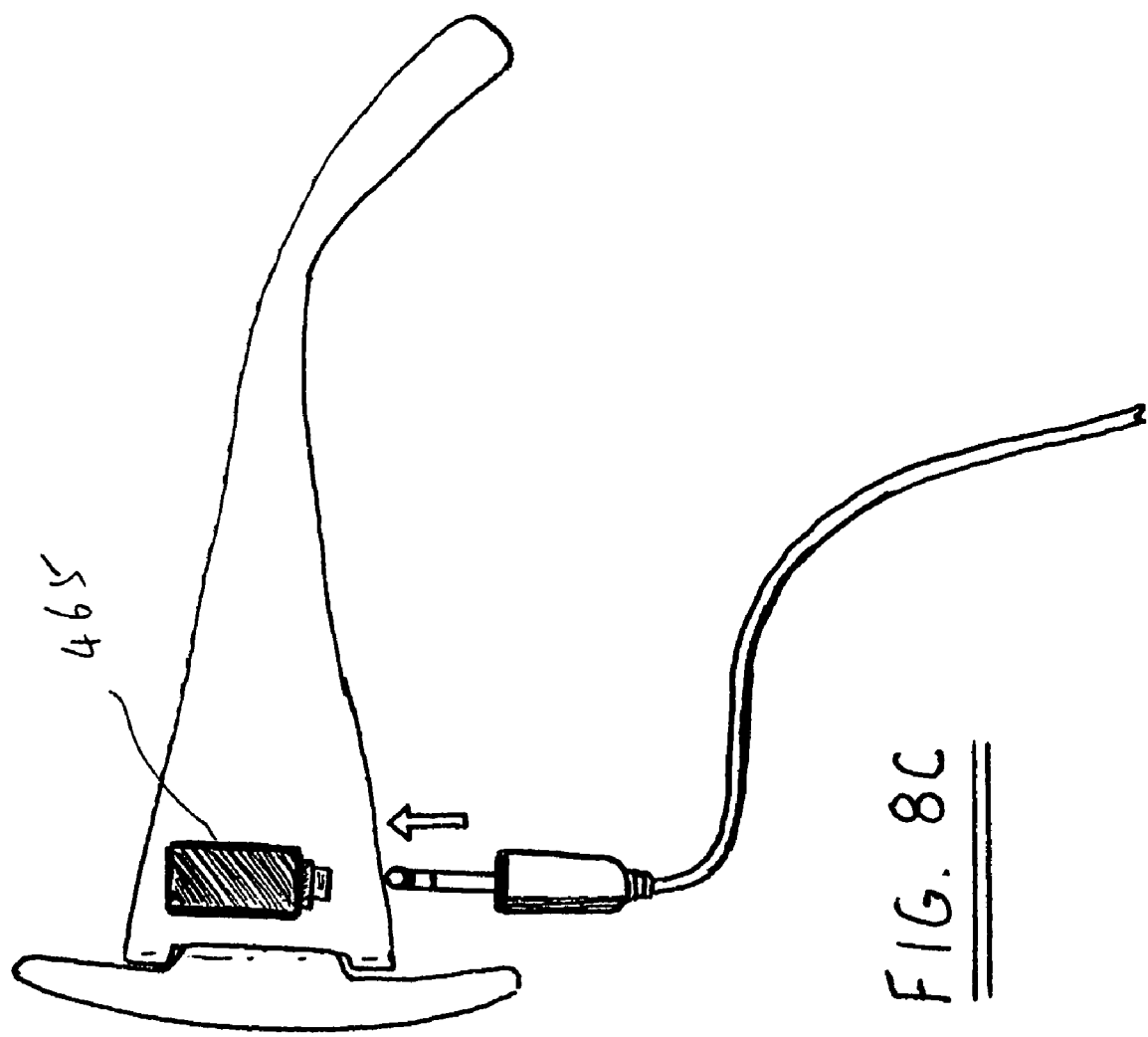

EYEGLASSES WITH ELECTRICAL COMPONENTS

CROSS-REFERENCE TO RELATED APPLICATIONS

This application is a continuation-in-part of U.S. patent application Ser. No. 10/964,011, filed Oct. 12, 2004 now U.S. Pat. No. 7,192,136, and entitled "TETHERED ELECTRICAL COMPONENTS FOR EYEGLASSES," which is hereby incorporated herein by reference, which in turn claims priority to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference; (v) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (vi) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

The application also claims priority to each of: (i) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; (ii) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference; (iii) U.S. Provisional Patent Application No. 60/618,107, filed Oct. 12, 2004, and entitled "TETHERED ELECTRICAL COMPONENTS FOR EYEGLASSES," which is hereby incorporated herein by reference; (iv) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (v) U.S. Provisional Patent Application No. 60/647,836, filed Jan. 31, 2005, and entitled "EYEGLASSES WITH HEART RATE MONITOR," which is hereby incorporated herein by reference; and (vi) U.S. Provisional Patent Application No. 60/647,826, filed Jan. 31, 2005, and entitled "EYEWEAR WITH ELECTRICAL COMPONENTS," which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. patent application Ser. No. 10/964,011, filed Oct. 12, 2004, and entitled "TETHERED ELECTRICAL COMPONENTS FOR EYEGLASSES," which is hereby incorporated herein by reference; (iii) U.S. patent application Ser. No. 11/006,343, filed Dec. 7, 2004, and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005, and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,269, filed Jul. 15, 2005, and entitled "EYEWEAR SUPPORTING AFTER-MARKET ELECTRICAL COMPONENTS," which is hereby incorporated herein by reference; (vii) U.S. patent application Ser. No. 11/183,283, filed Jul. 15, 2005, and entitled "EVENT EYEGLASSES," which is hereby incorporated herein by reference; (viii) U.S. patent application 11/183,262, filed Jul. 15, 2005, and entitled "EYEGLASSES WITH HEARING ENHANCED AND OTHER AUDIO SIGNAL-GENERATING CAPABILITIES," which is hereby incorporated herein by reference; (ix) U.S. patent application Ser. No. 11/183,263, filed Jul. 15, 2005, and entitled "EYEGLASSES WITH A CLOCK OR OTHER ELECTRICAL COMPONENT," which is hereby incorporated herein by reference; and (x) U.S. patent application Ser. No. 11/183,276, filed Jul. 15, 2005, and entitled "EYEGLASSES WITH ACTIVITY MONITORING," which is hereby incorporated herein by reference.

FIELD OF THE INVENTION

The present invention relates generally to glasses and more particularly to glasses with embedded electrical components.

BACKGROUND OF THE INVENTION

Many of us have experienced the inconvenience of trying to listen to a piece of music from a portable device in an outdoor environment, particularly in cold weather. First, we remove the device from inside our jacket. Then, we take off our gloves to find the right song, connect the device to a headset, and put on the headset. After we have finished listening, we go through the process again to put the device back into our jacket. To a certain degree, we are somewhat used to such procedures. However, to look at this objectively, going through the multi-step process just to listen to a piece of music is cumbersome. Such inconvenient procedures are not limited to hearing music. For example, it may not be much easier for us to use the cell phones or cameras and the like.

It should be apparent from the foregoing that there is still a need to increase the ease of handling electronic devices.

SUMMARY OF THE INVENTION

The present invention provides a pair of glasses with one or more embedded or partially embedded electrical components. In a number of the embodiments of the invention, with one or more electrical components in the glasses, the electrical components are much easier to operate. For example, you do not have to take an electronic device out from your pocket to use it. The electronic device may already be in your glasses, and you just have to turn it on.

Embedding electrical components into glasses has become easier due to a number of industrial trends. First is the miniaturization of electrical components. Another reason is that many different styles of glasses in the industry have more surface areas. They can have wider temples at the hinges of the frames. The wider temples might be for the placement of logos. They can have shields at the edges of the lens holders of the frames. This can be for stylistic reasons. Or, they can be for health reasons. For example, some people may want to minimize the amount of sunlight or ultraviolet light going into their eyes. One way is to have sunglasses with frames or shields on frames that better fit their facial profile. Such frames provide more areas to hold electrical components. Further, the chance for the electrical components to adversely affect the style of the frames is reduced.

The invention can be implemented in numerous ways, including as a system, device, apparatus, and method. Several embodiments of the invention are discussed below.

In one embodiment, the electrical components in a pair of glasses include a speaker and a connector, both at least partially embedded in the glasses. The connector can be a standard or a non-standard connector. The connector can be a male or a female connector. The connector can be at different location on the glasses. For example, the connector can be at the end of a temple of the glasses. The speaker is electrically coupled to the connector. The connection can be with a printed-circuit board in the glasses. The printed-circuit board can be a flexible or rigid printed-circuit board. With the connector, the glasses can access audio signals from an external device, such as a multimedia asset player.

In another embodiment, a pair of glasses includes a storage medium. The memory device can be coupled to another electronic instrument external to the glasses through one or more connectors at the glasses. Such a pair of glasses allows file storage in the glasses.

In yet another embodiment, a pair of glasses includes a speaker, a coder/decoder, a processor and a storage medium. The pair of glasses can serve as a multimedia asset player, such as a MP3 player. There can also be a connector at the glasses to facilitate the transfer of multimedia assets.

In a further embodiment, one or more electrical components are in a base tethered to a pair of glasses. For example, a battery to provide power for the electrical components in the glasses can be in the base. The base itself can have a connector to allow it to be tethered to another electronic device. In a number of embodiments, the base is considered to be a part of the glasses.

Instead of just receiving signals, in one embodiment, a pair of glasses also has a microphone and a wireless transceiver. The pair of glasses allows a user to engage in wireless communication.

In another embodiment, a pair of glasses with wireless coupling capabilities includes a preference indicator. The indicator allows a user to indicate the user's preference regarding, for example, what is being output by the glasses. There can be a radio embedded in the glasses. If the user provides her preference on, for example, the song being played, her preferences can be remotely tracked by a third party. There can be a multimedia asset player in the glasses, with the multimedia assets wirelessly received by the glasses. If the user provides her preference on the assets being played, these assets can be stored in a storage medium in the glasses for later consumption.

In yet another embodiment, there can be one or more knobs on the glasses, for controlling operations of electrical components in the glasses. The location and the number of knobs vary depending on the applications.

In a further embodiment, the glasses include a camera. The camera captures what the user sees. In other words, what the user sees can be what the user gets. Images captured can be stored at a remote site. This can be achieved, for example, by downloading the images to a storage device using a connector at the glasses. Or, if the glasses have wirelessly connection capabilities, the images can be wirelessly transmitted to the remote site. The glasses with a camera allow the user wearing the glasses to be remotely control.

In still another embodiment, a pair of glasses includes one or more sensors. There can be different types of sensors. For example, one sensor can be used to determine if the pair of glasses is being worn. Another sensor can be used to detect an environmental condition, such as the amount of ultraviolet radiation in the vicinity of the glasses. Yet another sensor can be used to detect a condition of the user.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 7 illustrates another non-standard connector, applicable to clamp onto a temple of a pair of glasses according to an embodiment of the invention.

FIGS. 8A-8E shows different embodiments of standard connectors located at different positions on the temple of a pair of glasses according to the invention.

Same numerals in FIGS. 1-21B are assigned to similar elements in all the figures. Embodiments of the invention are discussed below with reference to FIGS. 1-2 1B. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
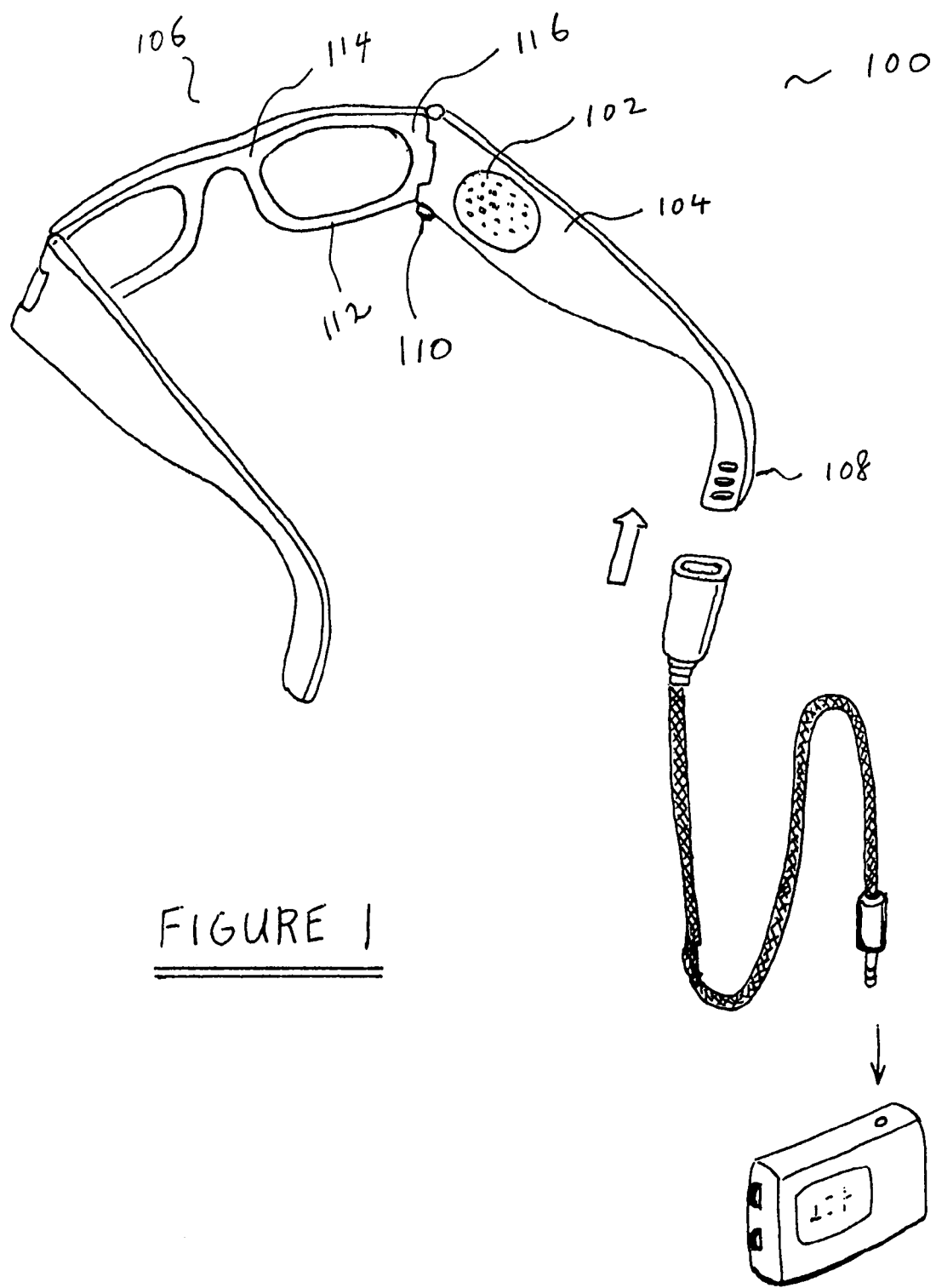
FIG. 1 shows one embodiment of the invention with a speaker in one of the temples of the glasses.

A number of embodiments according to the present invention regarding glasses with one or more electrical component partially or fully embedded, will be described. Many of them are applicable to different types of glasses, such as sunglasses, auxiliary frames, fit-over glasses, prescription glasses, safety glasses, swim masks, and goggles, such as ski goggles. In a number of embodiments, the frames of the glasses have more surface area than frames with minimal structure. For example, the temple regions of the glasses can have a taper profile. They are wider or broader when they are closer to the lens holders. Then they get narrower. In one embodiment, a wider or broader temple implies that the temple spans across a wider or broader area longitudinally down from the top of the head of the user. FIG. 1 shows an example of such an embodiment.

FIG. 1 shows one embodiment 100 of the invention where there is a speaker 102 at least partially embedded in one of the temples 104 of the glasses 106. The speaker 102 is closer to one end of the temple 104 than the other end. The end of the temple that the speaker 102 is closer to is the end that is in the vicinity of the lens holder or the hinge of the glasses 106, instead of the end 108 that is free. The speaker can be partially embedded in the glasses. For example, the mouth of the speaker, where sometimes there can be small holes on a cover, can be exposed.

In the embodiment shown in FIG. 1, the speaker 102 outputs audio signals in the direction towards the user. In another embodiment, the speaker 102 outputs audio signals in the direction away from the user. For example, the mouth of the speaker 102 can be facing outwards away from the user.

There are different approaches to embed an electrical component into a pair of glasses. For example, the glasses can be made of plastic (e.g., plastic frames). One way to produce such frames is to first assemble electrical components onto a circuit board. The circuit board can be shaped to fit, for example, the temple of the glasses. The circuit board is placed into a mold. Then, hot, molten plastic is injected around the circuit board to form the temple piece of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between the electrical components or circuit board and the metallic frames. One example of an insulting layer is a tape to encapsulate the electrical components. The tape is non-conducting so as to provide insulation and, to a certain degree, can also provide mechanical stiffness. One way to make such temples is to have two sheets of the metal die-stamped to form the two halves, or the two faces of the temple piece. A circuit board is made to fit into the space between the faces. Then, two die-cut pieces of insulator material (e.g., dielectric tape) can cover the top and the bottom surfaces of the circuit board. The board is then sandwiched between the faces to form the temple. In one example, the dielectric tape can be double-sided sticky tape, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards inserted into the mold along with the rubber at the time of molding.

Different types of speakers can be used, such as, standard, fixed-magnet/moving coil speakers; speakers with fixed-coil and a steel diaphragm; piezo-electric speakers; and electrostatic speakers.

Figure 2:
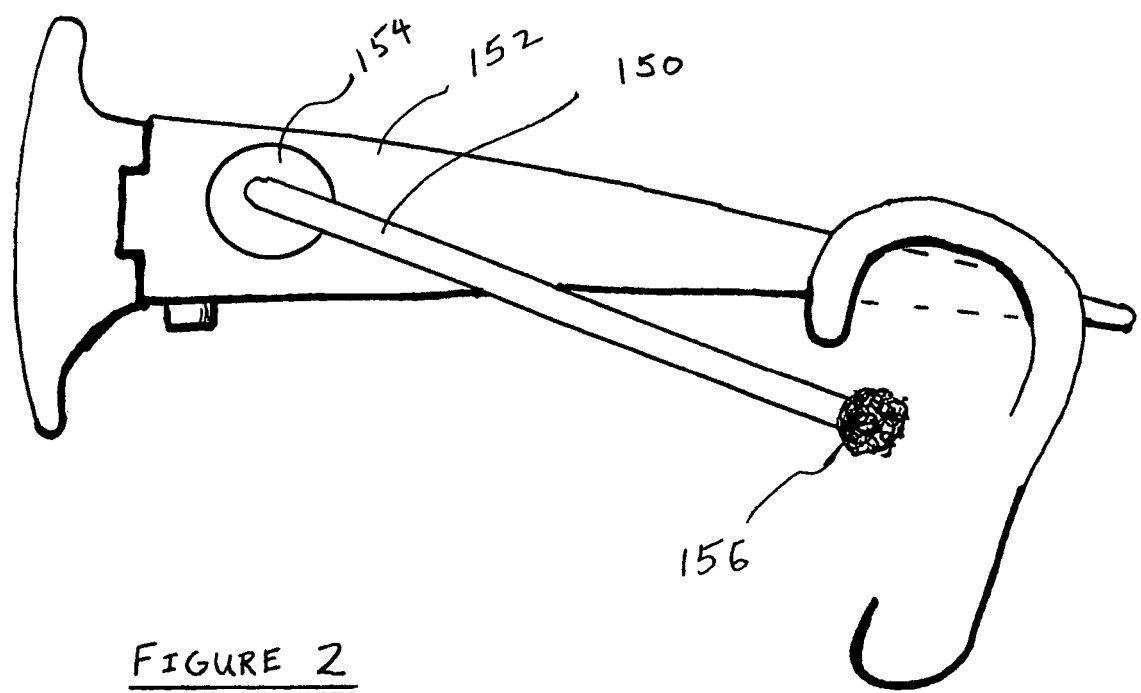
FIG. 2 shows a tube extending from a speaker at a temple of the glasses to guide sound to one of the ears of the user according to one embodiment of the invention.

In one embodiment, the glasses further include a tube, such as a plastic tube, extending from a speaker. The tube serves to guide sound generated by the speaker to one of the ears of the user. FIG. 2 shows an embodiment where a tube 150 is located on the outside of a temple 152. In another embodiment, the tube can be on the inside of a temple.

In one embodiment, the tube 150 can be rotated, such as from behind the temple 152 (if the tube is on the inside of the temple) to being downward at an angle towards one of the ears of the user, such as the position shown in FIG. 2. To increase flexibility, the tube can be attached to a rotating disk 154, which allows rotation about the speaker.

In another embodiment, the tube is malleable. This allows the tube to be placed in different positions.

Figure 3:
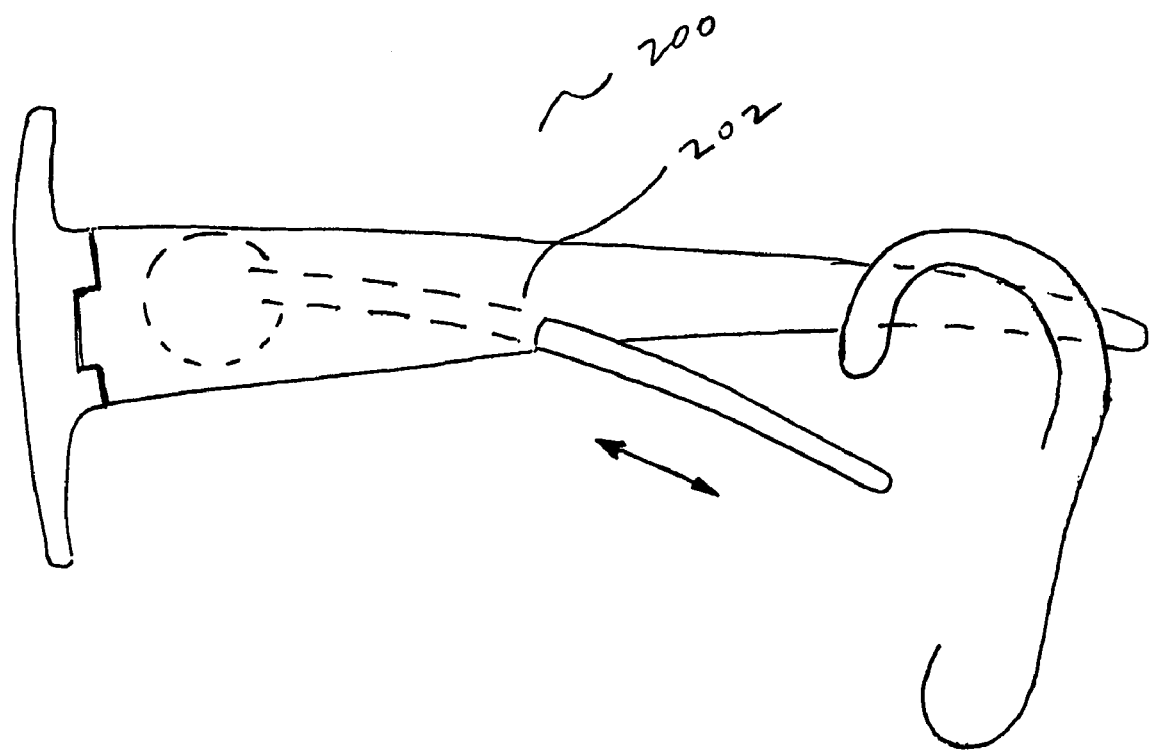
FIG. 3 shows a retractable tube extending from a speaker at a temple of the glasses according to one embodiment of the invention.

In one embodiment, the length of the tube is adjustable. FIG. 3 shows such an embodiment 200 of a pair of glasses with a retractable tube 202. In the figure, the tube is shown to be in its extended position.

To further enhance sound coupling, in one approach, there is a plug 156 at the end of the tube for inserting into an ear of the user. The plug can be an ear bud. The plug can provide a cushion, foam rubber or other materials. Such materials give comfort and/or enhance sound coupling to the ear canal.

Figure 4:
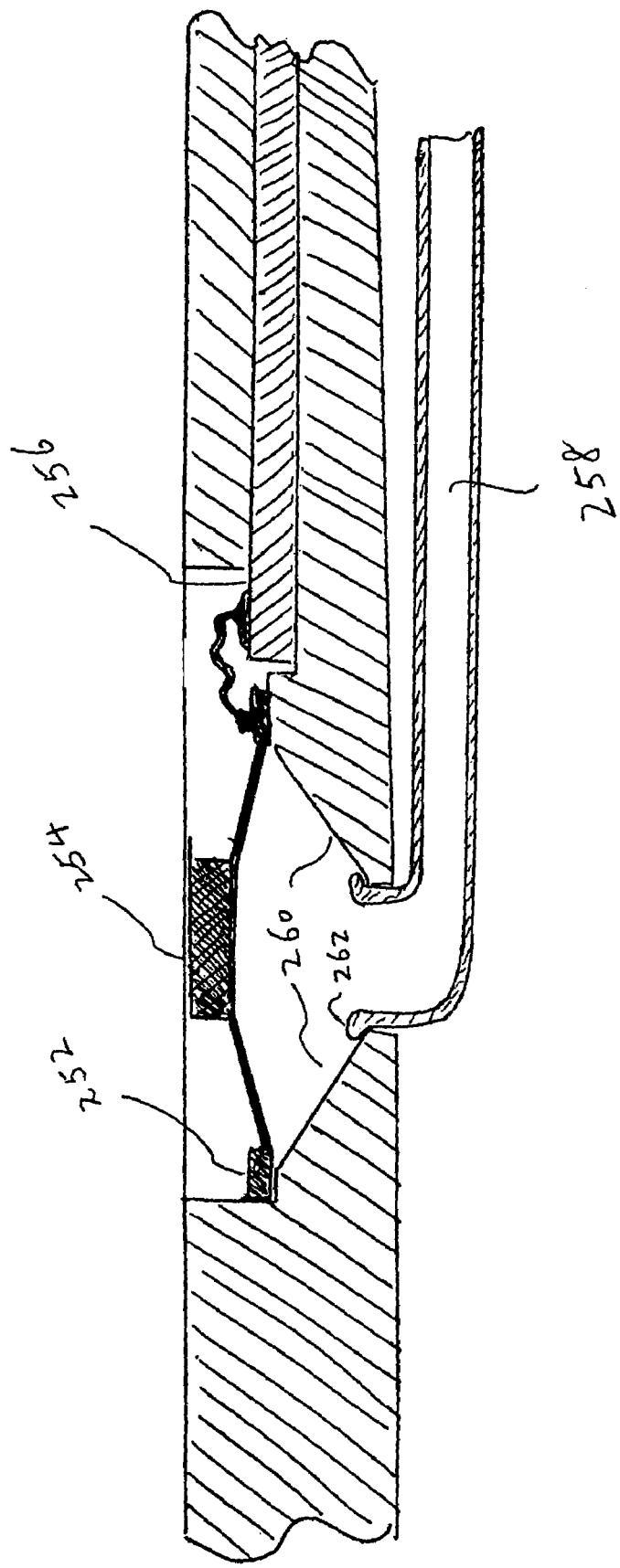
FIG. 4 shows a funnel at the output of a speaker in the glasses according to one embodiment of the invention.

In another approach, there is a funnel at the output of the speaker. FIG. 4 shows the cross section of such a funnel from a speaker at a temple region of the glasses. As shown in FIG. 4, the speaker 254 sits on a speaker frame 252, and the speaker 254 is electrically connected to a circuit board 256. As sound is generated from the speaker 254, the sound propagates to a tube 258 through a structure 260 in the shape of a funnel. Such a structure helps guide the sound to the tube (i.e., improved sound coupling). Also, FIG. 4 shows the tube, which can be the tube 150 shown in FIG. 2, mounted onto the temple region of the glasses with a circular lip 262. Such a lip 262 allows the tube 258 to rotate relative to the glasses. In the embodiment shown in FIG. 4, the speaker 254 is fully embedded in the glasses.

As an alternative to or in conjunction with the tube, the glasses can include a channel to likewise guide sound generated by the speaker to one of the ears of the user. For example, the channel can be formed within a temple. The temple also has an opening to output the sound towards the user's ear.

FIG. 1 shows one speaker at one of the temples. There can be more than one speaker at each temple. In one embodiment, there can also be at least one speaker at each temple. The two speakers can generate stereo effects.

In another embodiment, the glasses can provide four or more speakers to give a high fidelity sound or a surround sound effect. For example, each temple can include one speaker in front of the user's ear, and one speaker behind the user's ear. The different speakers can generate different portions or sections of the sound. Further, if a base (discussed below) or portable electronic device is coupled to the glasses, the base or portable electronic device can contain another speaker, such as a base or woofer speaker. Such embodiments enable the glasses to provide a personal high-fidelity sound or a surround-sound environment.

Electrical signals can be coupled to an electrical component, such as a speaker, in a pair of glasses through a number of mechanisms. In one embodiment, there is an electrical connector at least partially embedded in the glasses. In other words, at least a portion of the connector is inside the glasses. The connector is electrically coupled to the speaker (or other electrical component) by, for example, a conductor. The conductor can be on a printed-circuit board. In one embodiment, the conductor is also embedded in the glasses.

Figure 5:
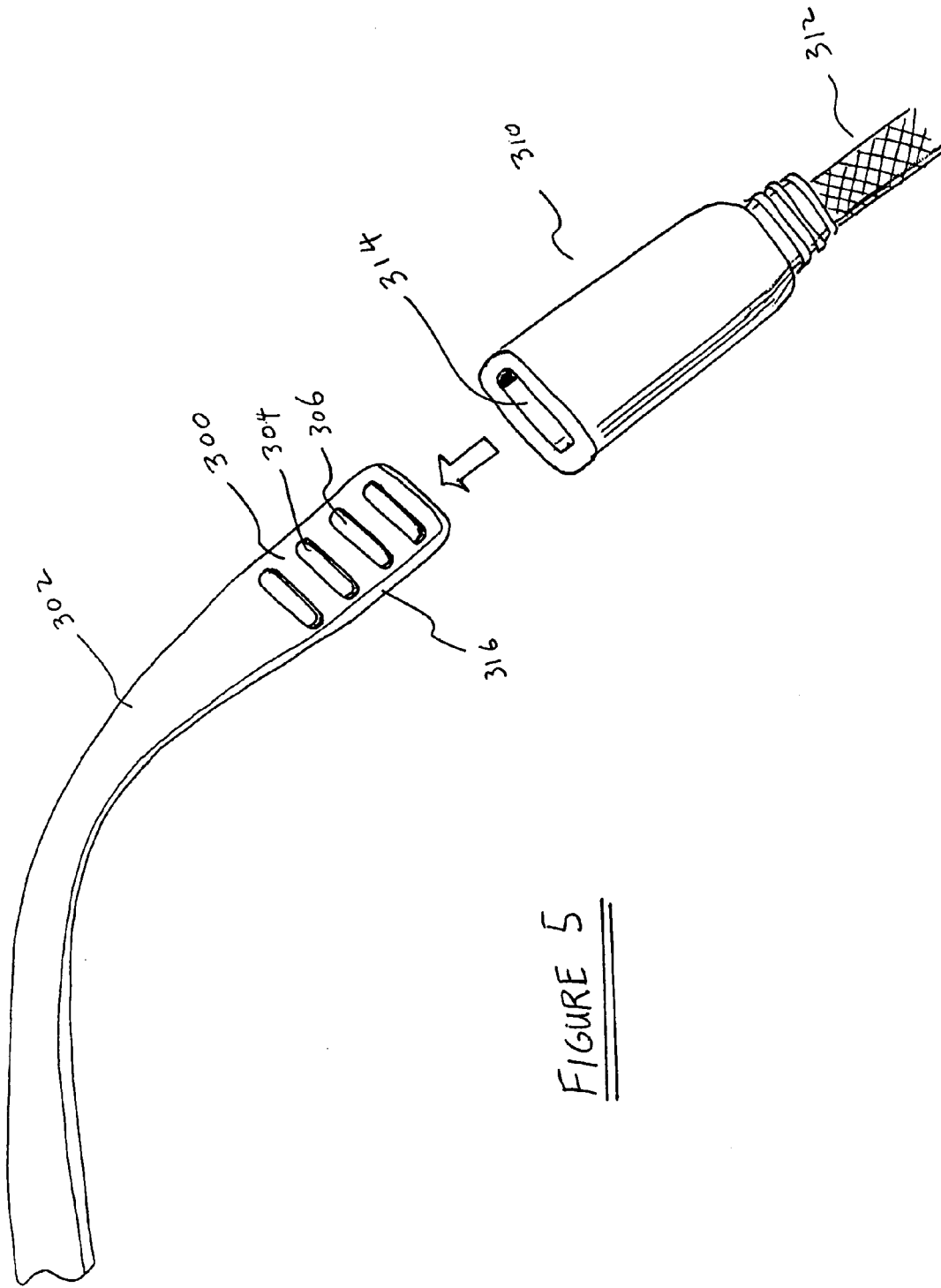
FIG. 5 shows a male connector at the end of a temple according to one embodiment of the invention.

Regarding connectors, FIG. 5 shows one embodiment where the connector is not a standard connector. The end 108 of the temple 104 of the glasses 106 shown in FIG. 1 has a similar connector. In FIG. 5, the connector is a male plug or a male connector 300 at the end of a temple 302 of a pair of glasses. The connector 300 is connected to the speaker through, for example, one or more wires embedded in the temple. Electrical signals external to the glasses can then be coupled to the speaker (or other electrical component) through the plug.

As shown in FIG. 5, the free end of the temple 302 can have a relatively flat cross section. There can be one or more electrically-conductive contacts, such as 304 and 306, on one or both of the flat surfaces of the temple. In FIG. 5, four contacts are shown on one surface of the temple. The contacts, 304 and 306, can be metal pads or bumps.

In one embodiment, a non-standard connector can be made using printed-circuit board technologies. First, a printed-circuit board with printed conductors connected to metal contact bumps is produced. Then plastic is overmolded around the printed-circuit board, with the mold designed to shut off around the bumps or pads. The overmolded plastic can serve as the temple, and the pads would be left exposed. Thus, portions of the printed circuit board are covered by plastic, and areas with the bumps or pads are exposed for connection. These pads serve as the connectors for the glasses.

Regarding printed-circuit boards, there can be one or more circuit boards in the glasses. For example, there can be a circuit board in one of the temples of the glasses. Or, the circuits can be divided into two circuit boards, one in each temple of the glasses. The circuit boards can carry additional electrical components to be described below.

In one embodiment, the circuit boards are rigid. In another embodiment, the circuit boards are made of flexible materials, such as a polyimide sheet, like Kapton®. In one embodiment, the circuit board is configured or adapts to the shape of the temple in which it resides.

As shown in FIG. 5, the end of the temple 302 serves as a male connector (plug) 300. The non-standard male connector 300 can be received by a non-standard female connector (plug) 310. Typically, the female connector 310 makes electrical and physical connection through grabbing around the male plug. The female connector 310 can be connected to a cable 312.

Figure 6A:
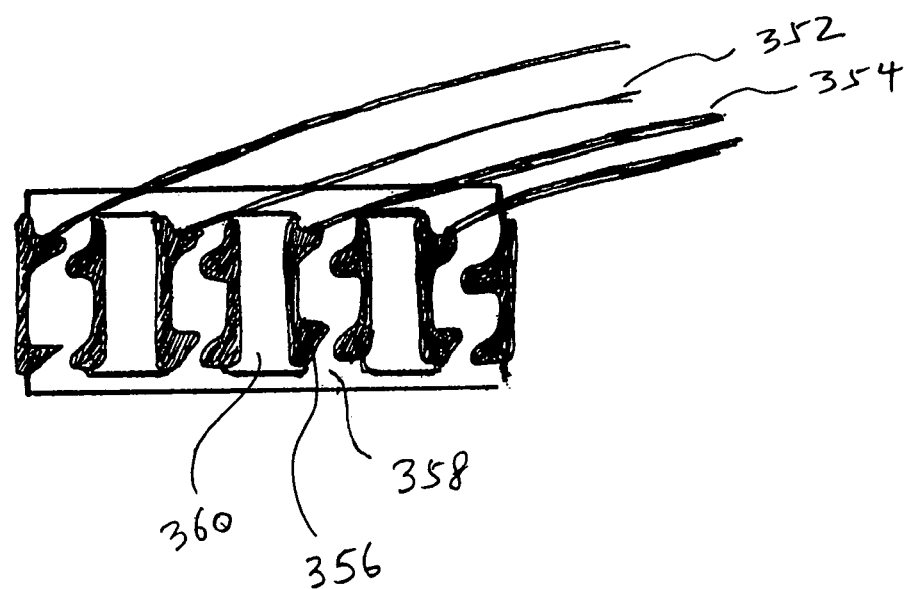
FIGS. 6A-6B illustrate a process to make a non-standard female plug couple to a male connector at a pair of glasses according to one embodiment of the invention.
Figure 6B:
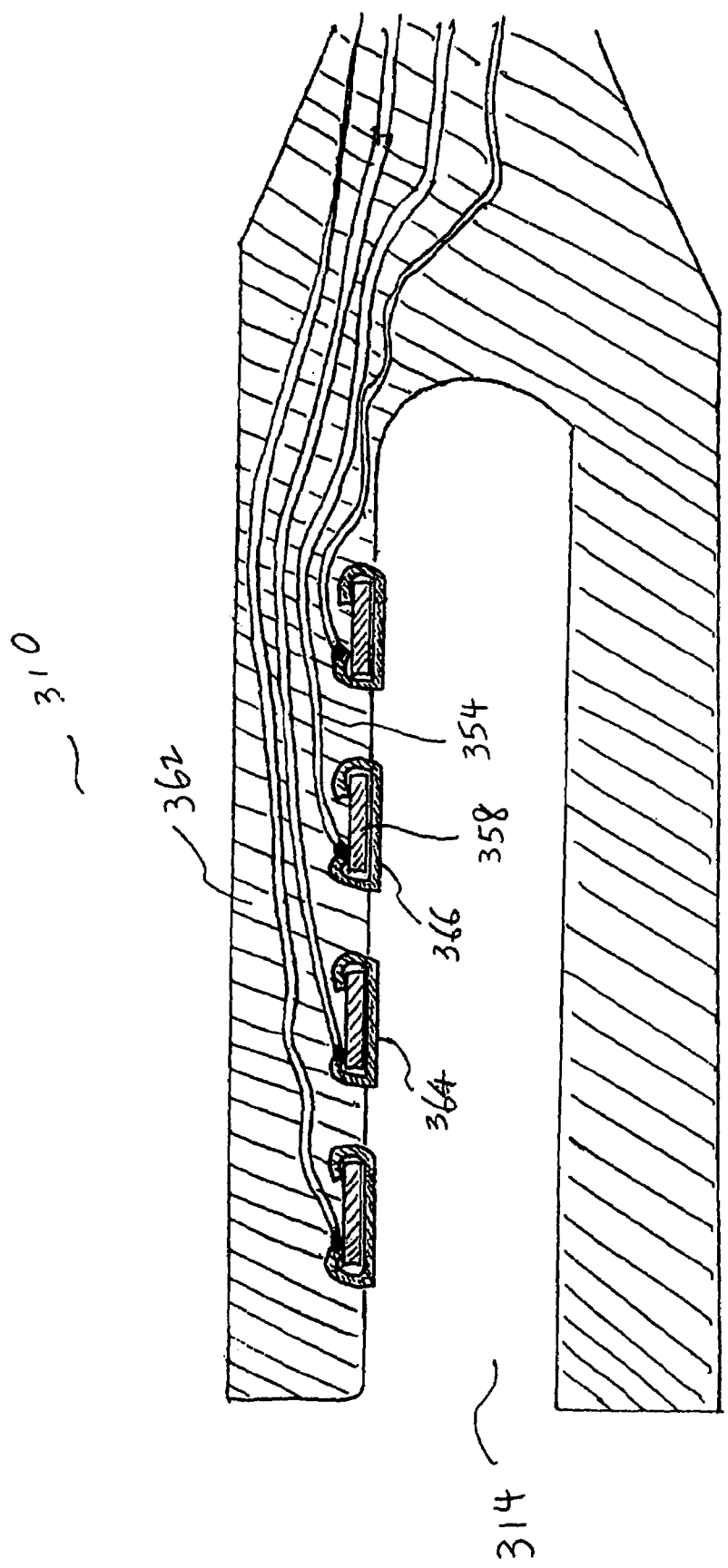

FIGS. 6A-6B illustrate a process to make the non-standard female plug 310. First, an electrical wire 354 is attached to a small sheet or piece of metal 356. FIG. 6A shows a number of such wires, with a number of the metal sheets or pieces crimped to a hard PVC 358. The figure shows the back side of the crimped board with the wires and with a number of holes, such as 360. Then the frame is overmolded with a soft PVC. FIG. 6B shows a cross section of the overmoded frame 362 with the soft PVC. As shown in the figure, a number of the metal sheets, such as 364 and 366, are exposed. They are the metal contacts in the female connector 310. Instead of the above approach, alternatively, a wire can be attached to a sheet of metal by putting the wire between the metal and the plastic as the metal is crimped onto a plastic. When the temple (i.e., male connector 300) is inserted into the female plug, the soft PVC material stretches slightly, providing a spring-force to keep the contacts connected.

The hard PVC can have a hardness of over 80 durometer, while the soft PVC can have a hardness of less than 50 durometer. The hard PVC can be replaced by other materials, such as Polypropylene or cloth. The soft PVC can be replaced by Silicone, or a thermo-plastic elastomer, such as Kraton®.

Referring to both FIG. 5 and FIG. 6B, when the male connector 300 is inserted into the slot 314 of the female connector 310, the metal pads, 304 and 306, will get in contact, or mate, with the metal sheets, 364 and 366.

In one embodiment, as long as the male connector 300 is pushed all the way into the female connector 310, the pads are aligned correctly to the sheets for electrical connections. In another embodiment, there is an alignment mechanism to guide the position of the temple relative to the female connector so as to ensure the conductive sheets to be in contact with the conductive pads. For example, there can be a registration location to indicate that the male connector is at the appropriate position relative to the female connector. There can be an alignment extension, which can be a partial sphere, close to the end of the temple 302, such as between the pads 304 and 306, at 316. And, there can be a corresponding alignment notch at the female connector 310. When the extension is received or caught by the notch, the male connector 300 is in the appropriate position relative to the female connector 310. In other words, the alignment is proper, and the pads and the sheets are in contact.

FIG. 5 shows the non-standard male connector 300 at one end of a temple of a pair of glasses. In yet another embodiment, a non-standard connector can be at another location. FIG. 7 shows another example of a non-standard connector 400. The connector 400 includes one or more conductive pads, 412 and 414, on the top side of a temple 402. The connector 400 is designed to receive another connector 406 that grabs onto the side of the temple 402. There can be an indentation 404 on the temple 402 to receive the other connector 406. The other connector 406 can include a top 420 and a bottom 416 clip. There are a number of conductive pads or sheets inside the other connector 406. The indentation 404 provides an alignment to indicate where the top clip 420 of the other connector 406 should grab onto the temple 402 for connection. At that position, the conductive pads at the temple will be in contact with the conductive pads or sheets at the other connector 406. There can also be another indentation 418 at the temple 402 to receive the bottom clip 416. This can further enhance the alignment process and to secure the connection.

In FIG. 7, the other connector 406 is coupled to one end of a cord and a plug 408, which can be inserted into a portable device 410, can be connected to another end of the cord. The portable device, for example, can be a cell phone. This type of non-standard clip-type connector could be easily applied to the temple with one hand, for example, while the user is driving a car.

A number of non-standard connectors have been described. In another embodiment, the contacts are based on standard connectors, which can be off-the-shelf connectors. FIGS. 8A-8E show a number of examples of such connectors.

Figure 8A:
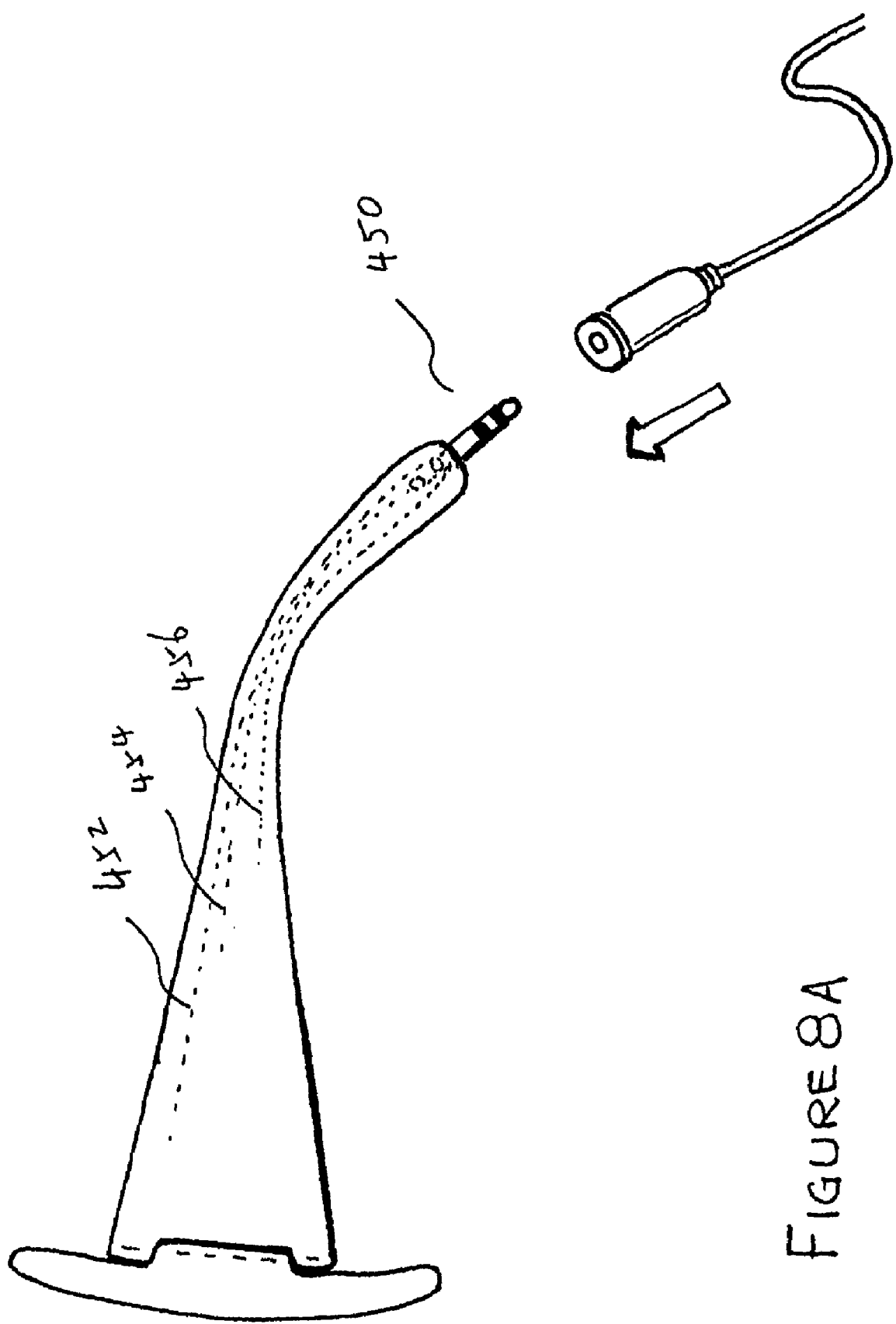

In one embodiment, the standard connector is a standard cylindrical plug located at the end of a temple. From a different perspective, the temple molds around the end of the plug. FIG. 8A shows one such embodiment. The plug 450 can be a standard audio connector or a 3-wire or three terminal plug, such as a 3.5 mm male stereo mini-phone plug. The 3 wires for such a plug are typically one for ground, the other two applicable for two signals, such as for creating stereo effects. FIG. 8A also shows the three wires, 452, 454 and 456, inside the temple, extended from the plug 450. These wires are for connection to electrical components of the glasses.

In one embodiment, the cylindrical plug 450 shown in FIG. 8A can be protected, encapsulated or shrouded. Or, at least a portion of the plug is protected, encapsulated or shrouded. Such protection can, for example, be for esthetic reasons, or to prevent the plug from scratching the face of the user when the user is putting on the pair of glasses. In FIG. 8A, the plug 450 is partially embedded in a temple.

Instead of a three terminal plug, other types of standard cylindrical plugs applicable to different embodiments of the present invention include a serial connector with 3 pins, typically one for ground, one for transmitting data (Tx) and the third for receiving data (Rx); or (b) a 2-wire connector, one served as ground, the other for carrying, such as power and modulated signals.

In yet another embodiment, instead of a cylindrical plug, the standard connector at the end of a temple of a pair of glasses is a USB or a FIREWIRE connector.

A number of embodiments have been described where the standard connector(s) at the glasses are male connectors. In yet another embodiment, the standard connector(s) in the glasses are female connectors. For example, there can be a 3.5 mm female stereo mini-phone plug at the end of a temple of a pair of glasses. At least a portion of the female connector can be protected, encapsulated or shrouded. For example, the female connector can be recessed within the end of a temple.

Figure 8B:
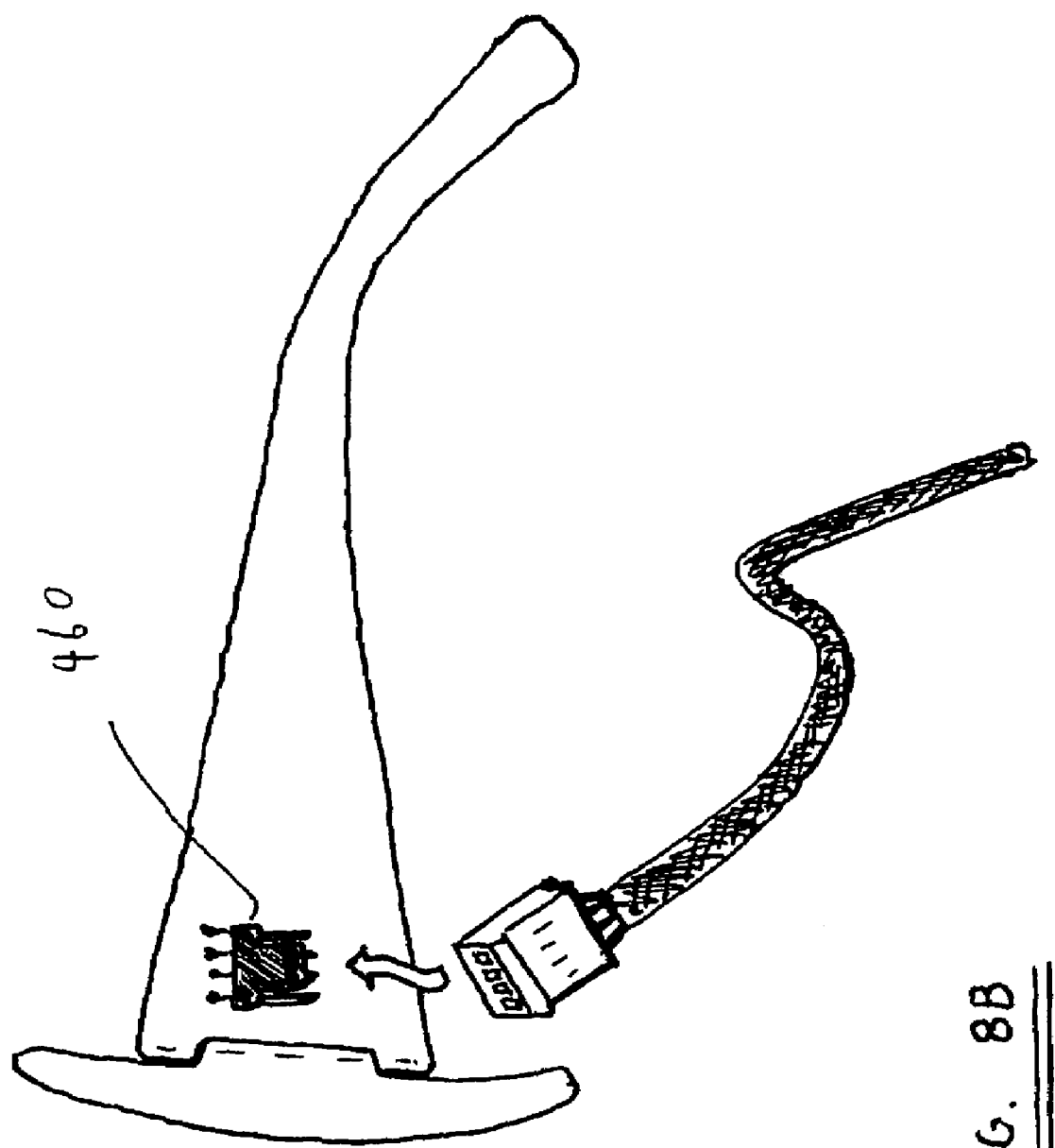
Figure 8D:
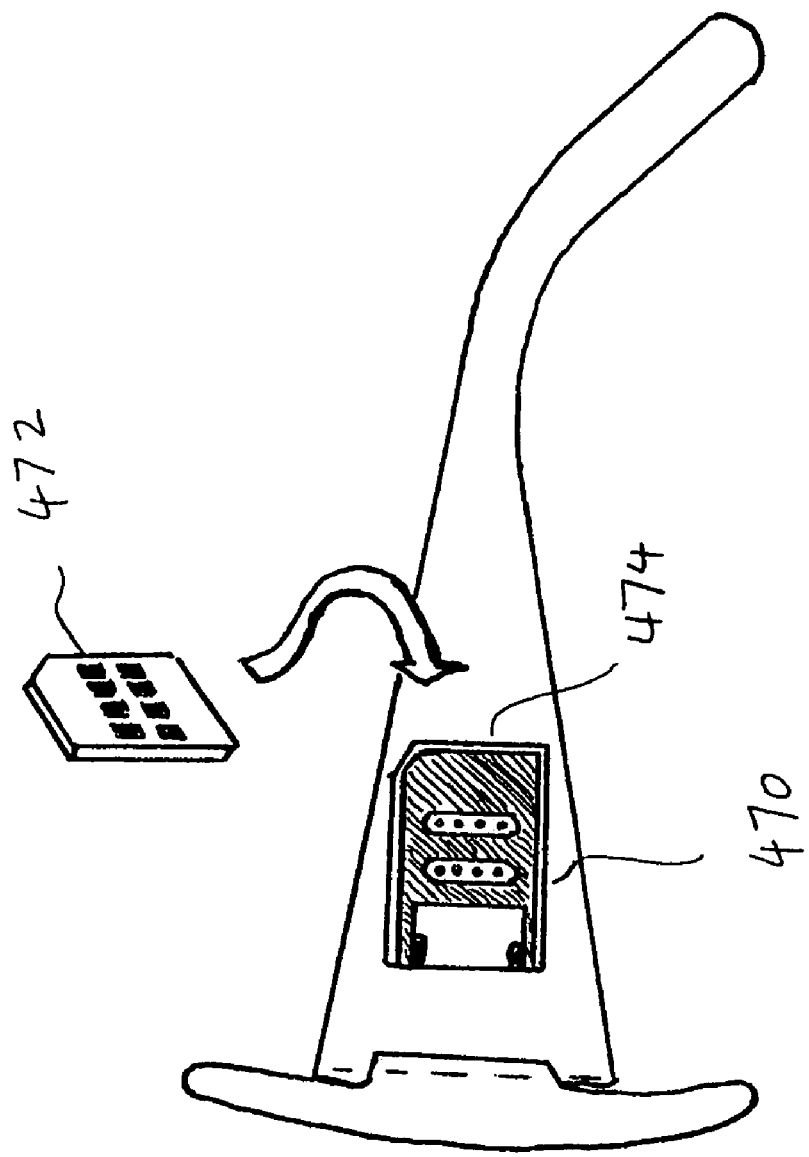
Figure 8E:
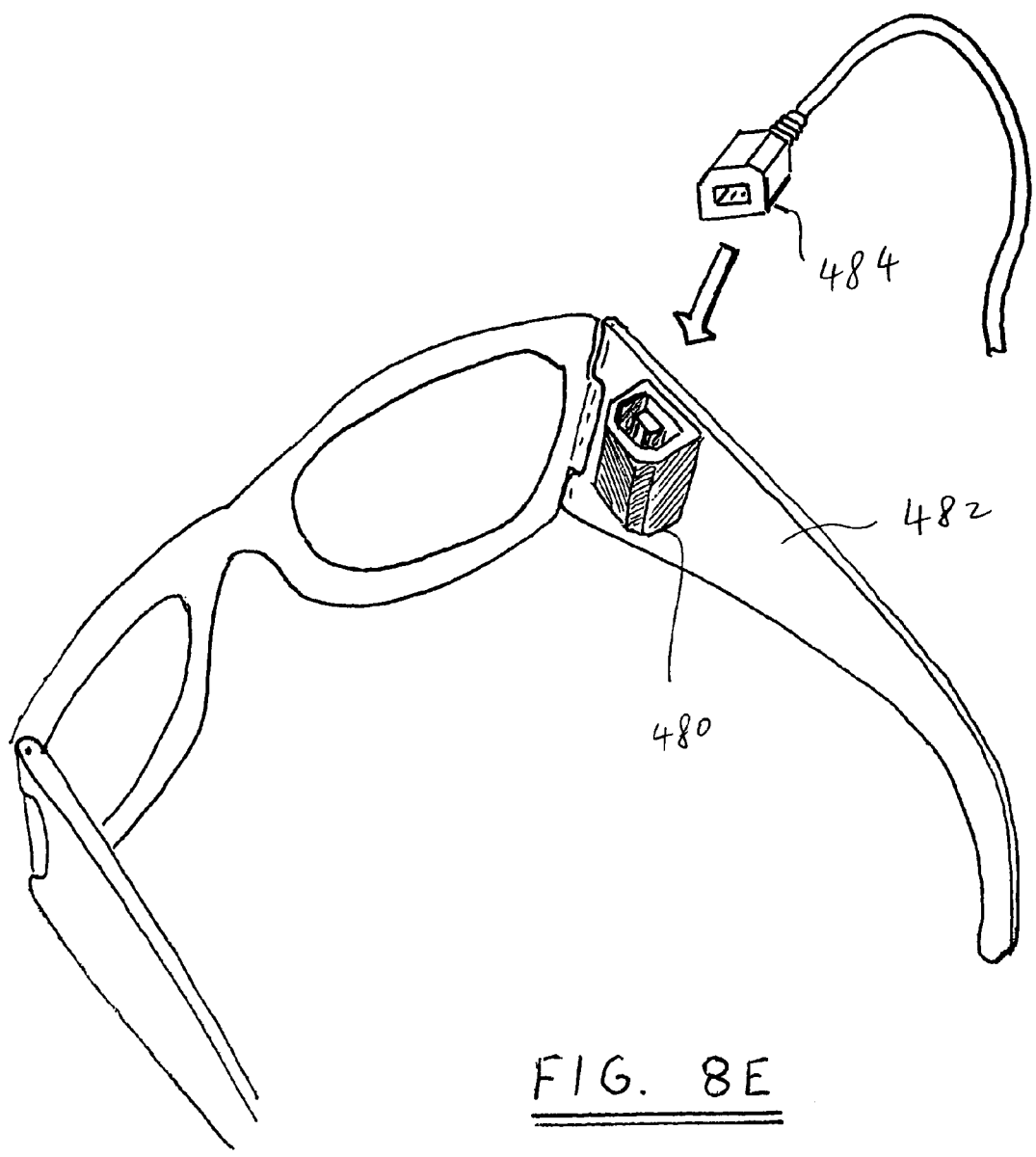

FIGS. 8B-8E show different examples of standard connectors located or partially embedded not at the end of a temple of a pair of glasses, but, for example, on the side of the temple, such as on the inside surface or the outside surface of a temple. FIG. 8B shows a 0.10" header plug 460, commonly known as a MOLEX connector, on such a surface. FIG. 8C shows a female mini-phone plug 465 on such a surface. FIG. 8D shows a card connector 470 to receive a card 472, such as a removable media card (e.g., memory card). There can be a cover 474 to secure and/or protect the media card 472 in place after it is inserted into the card connector 470. FIG. 8E shows a female USB connector 480 on the inside surface of a temple 482 to receive a male USB connector 484.

Figure 8F:
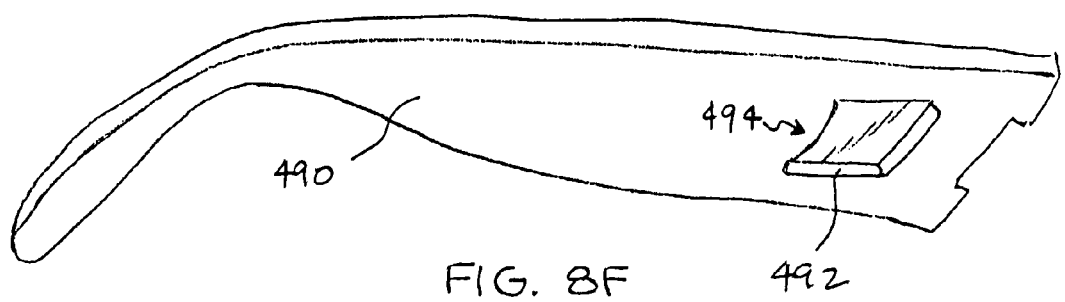
FIGS. 8F-8H are diagrams pertaining to providing a removable electronic device with an eyeglass frame according to one embodiment of the invention.
Figure 8G:
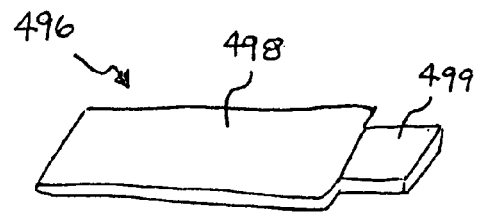
Figure 8H:
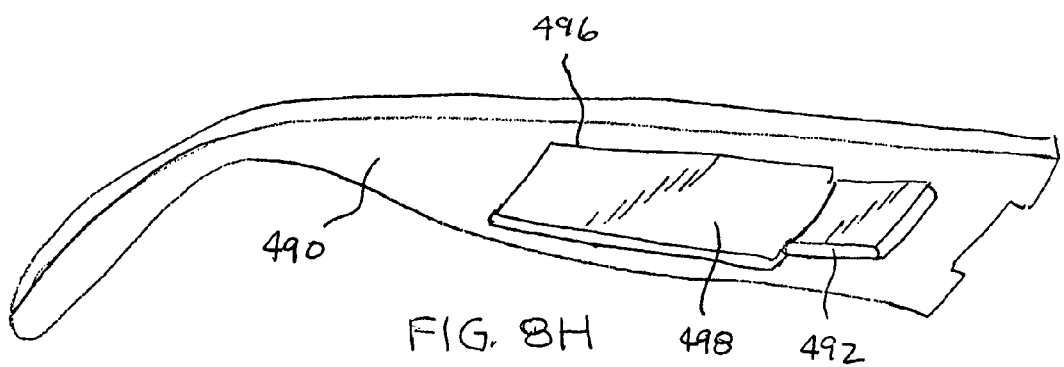

FIGS. 8F-8H are diagrams pertaining to providing a removable electronic device with an eyeglass frame according to one embodiment of the invention. FIG. 8F illustrates a temple 490 that includes a connector 492. The connector 492 includes an opening 494. A removable electronic device can be coupled to the temple 490 using the connector 492. More particularly, FIG. 8G illustrates a removable electronic device 496 that includes an electronic device housing 498 and a connector 499. As an example, the removable electronic device 496 can be a memory storage device, sometimes referred to as a memory card. FIG. 8H illustrates the removable electronic device 496 coupled to the temple 490. The removable electronic device 496 is coupled to one side of the temple 490, such side can be either an inside or outside surface of the eyeglass frame. When the removable electronic device 496 is coupled to the temple 490, the connector 499 of the removable electronic device 496 is inserted into the opening 494 of the connector 492. Physical forces between the connector 499 and the connector 492 operate to secure the removable electronic device 496 to the temple 490, yet permit the removable electronic device 496 to be removable therefrom.

In one embodiment, the connector 492 is not electrically connected to any electronic circuitry within the temple 490 or other parts of the eyeglass frame. In other words, the connector 492 provides a convenient means by which removable electronic devices can be coupled to the eyeglass frame. In another embodiment, the connector 492 can be coupled to electrical circuitry within the temple 490 or elsewhere within the eyeglass frame. Such an embodiment allows the electronic components within the removable electronic device 496 to be utilized with the electrical circuitry within the temple 490 or elsewhere within the eyeglass frame. For example, the removable electronic device 496 can provide data storage and/or other software modules to be utilized by or to utilize the other electrical circuitry within the temple 490 or elsewhere within the eyeglass frame. In any case, by attaching the removable electronic device 496 to the temple 490 (and thus the eyeglass frame), the removable electronic device 496 is able to be conveniently carried by the user of the eyeglass frame. In one implementation, the eyeglass frame, which includes the connector 492, becomes a docking station for the removable electronic device 496. As such, a variety of different removable electronic devices can be interconnected with the eyeglass frame, as desired. For example, the eyeglass frame can thus support different function or operations depending on the removable electronic device that is attached. For example, the eyeglass frame might operate as a camera, data storage device, FM radio, MP3 player, mobile telephone, pedometer, hearing enhancer, sun sensor, time piece, etc.

In one embodiment, the removable electronic device 496 can align itself with the orientation of the temple 490, such as shown in FIG. 8H. In FIG. 8G, the electronic device housing 498 can be said to have an elongated housing. The configuration (e.g., shape) and/or color of the removable electronic device 496 can also be designed to conform or complement the design of the temple 490. In one embodiment, the temple 490 might also have a recessed region to allow the portable electronic device to be less visually perceptible when attached to the temple 490 or to provide a more consistent contour of the temple 490.

In one embodiment, the connector 499 is a male connector, and the connector 492 is a female connector or a similarly sized structure. In one implementation the connector 499 is a peripheral bus connector, such as a Universal Serial Bus (USB) connector. In such cases, the connector 492 can also be a peripheral bus connector (either electrically functional or non-functional as noted above).

Although the embodiment illustrated in FIGS. 8F-8H utilize connectors, namely, electrical connectors, the removable electronic device 496 could be attached to the temple in other ways. For example, other means to provide physical forces to hold the removable electronic device 496 in place can be used.

Figure 8I:
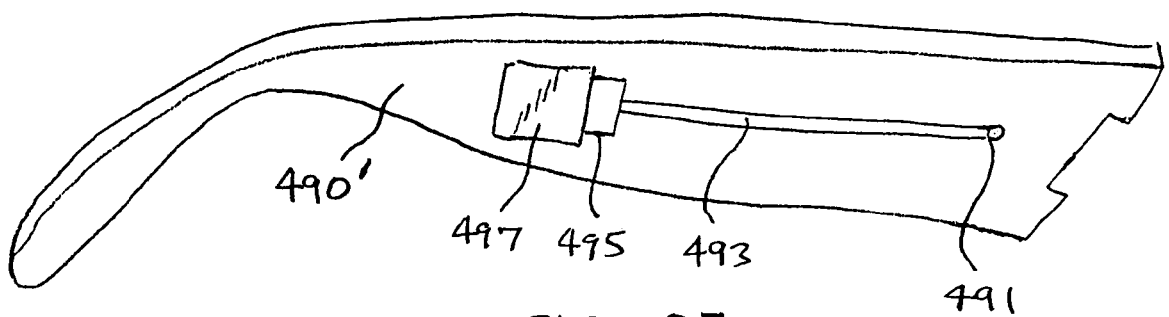
FIG. 8I is a diagram of a temple of an eyeglass frame according to another embodiment of the invention.

FIG. 8I is a diagram of a temple of an eyeglass frame according to another embodiment of the invention. In this embodiment, the temple 490' includes an opening 491 through which a cable 493 extends outward. The cable 493 has an electrical connector 495 connected at its end. The electrical connector 495 is electrically connected to electrical circuits within the temple 490' or elsewhere within the eyeglass frame such as by way of one or more wires contained within the cable 493. In one implementation, the length of the cable 493 is about one to four inches. The temple 490' shown in FIG. 8I also includes a receptacle 497. The receptacle 497 is affixed to or integral with the temple 490 to receive the electrical connector 495. Typically, the receptacle 497 provides a holding mechanism for the electrical connector 495 when not been utilized. When the electrical connector 495 is being utilized, the electrical connector 495 is removed from the receptacle 497 and coupled to a corresponding counterpart connector of another electrical device. The cord 493 can provide ease-of-use so that the electrical connector 495 can be maneuvered to couple to the counterpart connector. In one embodiment, the temple 490' can provide a recess for receiving the entire cable 493, with the outer surface of the receptacle 497 being substantially flush to the surface of the temple 490. So when the connector 495 is not in use, the connector 495 can be in the receptacle 497, with the cable 493 in the recess. In one embodiment, when the cable 493 is in the recess and the connector 495 inside the receptacle 497, the cable 493 has substantially no slack. Also, in another embodiment, the cable 493 can be retractable into the opening 491. In the embodiment shown in FIG. 8I, the electrical connector 495 is a male connector, and the receptacle 497 is a female connector or a similarly sized structure.

A number of standard and non-standard connectors have been described. Other types of connectors can also be used. In one embodiment, there is a connector adapter, which serves to transform such other type of connectors to a different interface. For example, an adapter can be a cord with one type of connector at one end and a different type of connector at the other end.

In one or more of the above embodiments, the glasses can access audio signals from another device through a connector at the glasses. The another device can be a multimedia asset players or a radio.

In one embodiment of the invention, the glasses have a storage medium (i.e., memory). The memory can be on a printed-circuit board and, for example, store 256 MBs or more. The memory can be a built-in or removable flash memory. The memory can be coupled to a device external to the glasses through one or more connectors at the glasses. As an example, a 256 MB flash memory is in one of the temples of a pair of glasses, and there is a USB connector at the free end of that temple to couple to an external device.

With the embedded storage medium, the glasses can upload information in the memory to or download information into the memory from an external device, such as a computer. A user can plug the glasses into the computer through a connector, either directly, or indirectly, with, for example, an intermediate wire in between. The user can store files in the glasses. Such an embodiment should reduce the chances of the user losing the files because the user has to lose the glasses as well.

Figure 9:
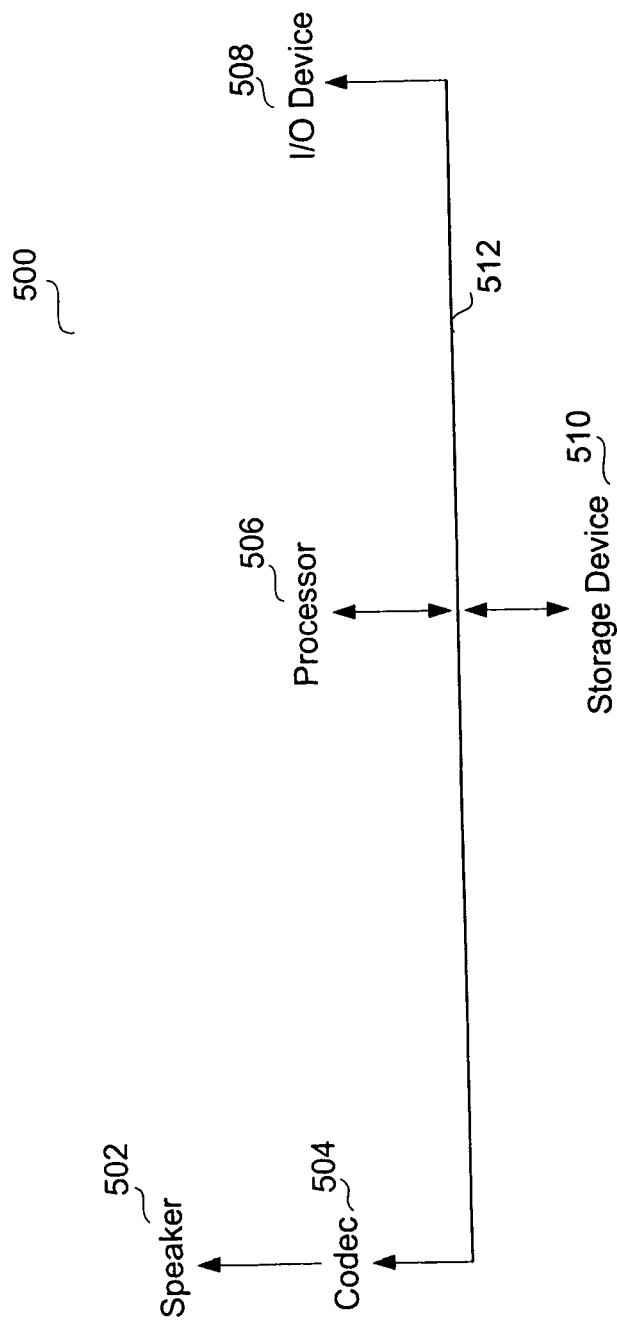
FIG. 9 shows some of the electrical components for a MP3 player according to an embodiment of the invention.

In yet another embodiment of the invention, a pair of glasses includes a multimedia asset player, such as a MP3 player. FIG. 9 shows some of the electrical components for a MP3 player 500 according to an embodiment of the invention. The player 500 includes a speaker 502 and a data bus 512, which facilitates data transfer among, for example, a processor 506, a storage device 510, and a coder/decoder (CODEC) 504. The processor 506, which can be a microprocessor or controller, controls the operation of the player 500. The storage device 510 stores the multimedia assets, such as MP3 files, or other types of media data that are appropriately formatted. In one example, the MP3 files are digitally encoded songs or other types of audio signals. The storage device 510 can include a number of separate storage elements. For example, the device 510 can be a flash memory device, or a minidisk device, and a cache, which can improve the access time and reduce power consumption of the storage device. The storage device 510 typically also includes a Read-Only Memory (ROM), which stores programs, utilities or processes to be executed in a non-volatile manner. The player 500 can also include a RAM, such as for the cache.

Once a media asset, such as a song, is selected to be played, the processor 506 would supply the asset to the CODEC 504, which decompresses the asset and produces analog output signals for the speaker 502. In one embodiment, the bus 512 is also coupled to an input/output device 508, which would allow a user to upload songs in the glasses to an external instrument, such as a computer, or download songs from the instrument to the glasses.

There are different approaches to select a song. In one embodiment, the songs or the media assets can be categorized in the MP3 player, and the categorization can be hierarchical, with multiple levels in the hierarchy. To illustrate, assume that there are three levels. The top level can be the name of the singer; the second level can be the time period when the asset was produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touch-screen display, allowing entries to be entered directly on the display. In yet another embodiment, entries can be selected based on voice recognition.

A number of embodiments have been described with the glasses having a connector. In one embodiment, the glasses can have more than one connector. For example, a pair of glasses with two connectors also has a speaker. One connector is, for example, at a broad side of a temple, as in FIG. 8D. The connector can be for coupling to multimedia assets of a MP3 player. Another connector is, for example, at the end of a temple, as in FIG. 8A. That connector can couple power to the glasses. The speaker can play the multimedia assets accessed from one connector, based on power from another connector.

As described, power (e.g., external power source) can be coupled to the glasses through a connector. In one embodiment, the power source is embedded inside or inserted into the glasses. Different types of power sources are applicable. For example, the power source can be a battery, a fuel cell, a solar cell, or a re-chargeable battery. The rechargeable battery can be charged through a connector at the glasses.

In an earlier application, namely, U.S. Provisional Patent Application No. 60/509,631, filed Oct. 9, 2003, and entitled "TETHERED ELECTRICAL COMPONENTS FOR EYEGLASSES," which has been incorporated herein by reference, there can be a base connected to the glasses through a cord. The cord can be just a piece of flexible conductor encapsulated by a flexible insulator. Typically, a cord includes a number of electrical wires or conductors. There can be one or more electrical components in the base, and there can also be one or more electrical components in the cord. The different types of connectors previously described can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic devices.

Figure 10:
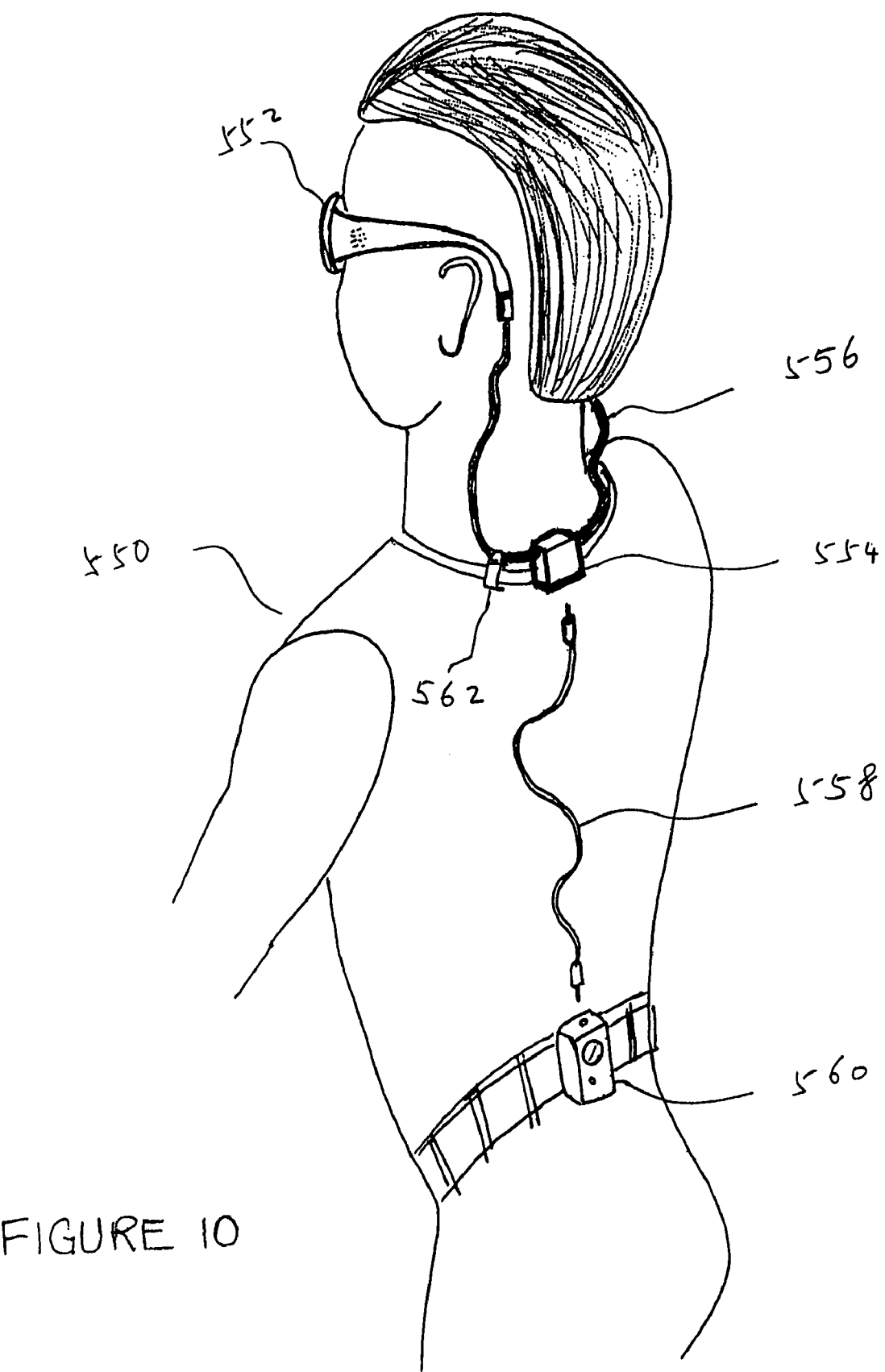
FIG. 10 shows an embodiment of the invention where a user is wearing a pair of glasses with electrical components, tethered to a base, which is connected to a portable device.

FIG. 10 shows an embodiment where a user 550 is wearing a pair of glasses 552, which include electrical components. There are also tethered electrical components in a base 554, which is connected to the glasses 552 through a cord 556. In addition, there is a wire 558 connected to a connector at the base 554 to a portable electronic device 560. The portable device 560 can be (a) a multimedia device, such as a MP3 player/recorder or a minidisk players, (b) a wireless communication device, such as a cell phone, or (c) a personal digital assistant, or other types of portable devices with computing and/or entertaining and/or communication capabilities.

Note that instead of connecting to the portable electronic device 560 through the base 554, in another embodiment, the glasses 552 directly connect to the portable device 560 through a cord.

In one embodiment, there is an attachment device 562, such as a pin or clip. The attachment device attaches at least a part of the glasses to the user's clothing. The attachment device 562 can serve to attach the cord 556 and/or the wire 558 and/or the base 554 to the user's clothing. The attachment can also be through other mechanisms, such as Velcro.

In a number of embodiments, the speaker described is assumed to emit audio signals. In one embodiment, the speaker emits ultrasonic signals. The glasses can be used, for example, as an insect repellant by transmitting ultrasound to repel insects, such as mosquitoes. In this embodiment, the one or more speakers broadcast the ultrasonic signals away from the user. In other words, the speakers face outwards, not inwards towards the user. In this embodiment, the glasses, which can include a base, also has a power source to provide power to the speaker. There can also be a control knob to turn the one or more speakers on/off on the glasses. There will be additional discussions on the control knob below.

In another embodiment, the glasses generating ultrasonic signals can be used to produce audio signals that are more directional. For example, two ultrasonic signals are generated by a speaker in the glasses, with their difference frequencies being the audio signals. The audio signals generated based on mixing the two ultrasonic signals can be much more directional than audio signals directly generated from the speaker.

Referring back to FIG. 1, in one embodiment, the glasses include a microphone 110. The microphone 110 can be at the end of a temple 104 close to a lens holder 112. Or, the microphone 110 can be in the lens holder 112, located directly adjacent to the temple 104. In yet another embodiment, there can be a small protrusion extending down from the temple to house the microphone.

With glasses having a microphone, one can use the glasses to record voices into, for example, a storage medium. The storage medium can be in the glasses, or can be in a base or a portable device attached to the glasses.

Different types of microphones can be used. For example, they can be electret microphones, crystal microphones, resistance microphones, piezoelectric microphones or moving-coil microphones.

In one embodiment, the glasses with a microphone also include a speaker that can generate directional sound. A user can speak into the microphone and his message can be transmitted from the glasses in a more directional manner.

In another embodiment, the glasses also include a notification electrical component to provide a notification to the user wearing the glasses. The notification can be to notify, alert or display information to the user. There can be a display located at the inside 114 of the lens holder, or at the vicinity of the junction 116 or the hinge of a lens holder and its corresponding temple facing the user. Or, there can be a display at the inside surface of a temple, or at other locations on the glasses. The display can be one or more light emitting diodes. To alert the user, one or more diodes can blink. The blinking can be of a specific sequence. Instead of diodes, the display can be a liquid crystal display. The display can provide indications or information to the user. For example, a number or a variable-height bar can be shown. Other than visual indications, the notification or alert can be audio, like a beeper.

In one embodiment, the notification electrical component is for selecting a multimedia asset in a multimedia asset player in a pair of glasses for the multimedia to play. The multimedia asset player can be a MP3 player.

A number of embodiments of the present invention have been described where electrical signals are transmitted to or from a pair of glasses through a physical connection. In one embodiment, electrical signals are wirelessly coupled to a pair of glasses. The coupling can be short range or long range. The coupling can be directly to the glasses, or to a base connected to a pair of glasses. The glasses with wireless coupling capabilities can be used to couple to a Bluetooth network, the Internet, a WiFi network, a WiMax network, a cell-phone network or other types of networks. The coupling can also be through a point-to-point link, such as an infrared link.

Figure 11A:
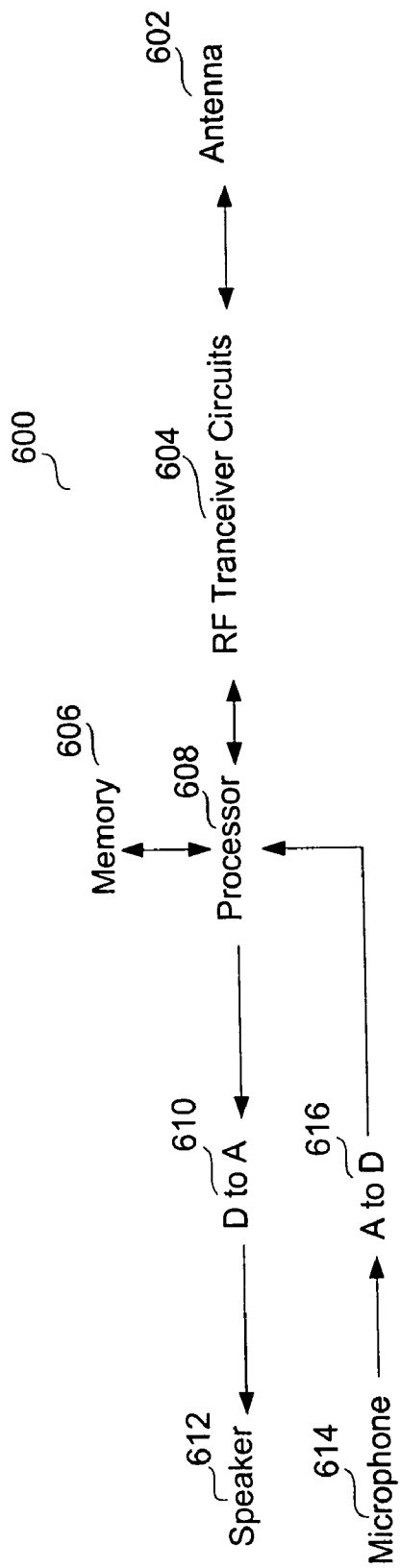
FIGS. 11A-11B show different embodiments of the present invention illustrating some of the electrical components for wireless connections to a pair of glasses.
Figure 11B:
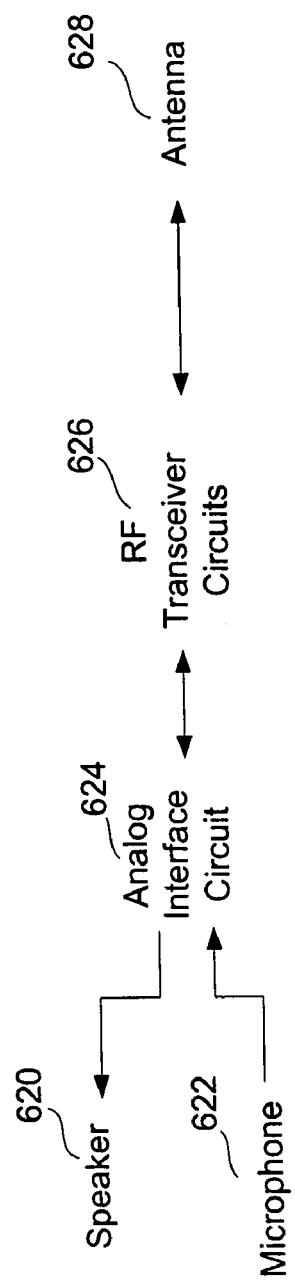

FIGS. 11A-11B show examples of some of the electrical components in or tethered to a pair of glasses for wireless connections, according to embodiments of the present invention. In FIG. 11A, a high frequency or RF antenna 602 wirelessly captures high frequency or RF signals for RF transceiver circuits 604. If the transceiver circuits are for a conventional superheterodyne system, the transceiver circuits 604 mix the RF signals down to IF signals. Then the IF signals are processed by baseband circuits. Digital outputs from the baseband circuits are coupled to a processor 608 for analysis and synthesis.

Outputs from the processor 608 are fed to a D-to-A converter 610 to generate audio signals for a speaker 612. Similarly, audio analog signals from a microphone 614 can be fed to an A-to-D converter 616 to generate digital low frequency signals for the processor 608 and then to the RF transceiver circuits 604. The low frequency signals are up-converted by the RF transceiver circuits 604 and wirelessly transmitted by the antenna 602.

In another embodiment, digital conversion is moved closer to the antenna. For example, instead of mixing RF into IF signals, the RF transceiver circuits 604 directly perform digital conversion from the RF signals.

Typically, high frequency filters are used at the front end of the RF transceiver circuits 604 for the RF signals. In one embodiment, to save space, FBAR (film bulk acoustic resonator) duplexer is employed. A set of piezoelectric filters can be used to separate incoming and outgoing signals. For cell phone operation, such filters can enable a user to hear and speak simultaneously. A number of these electronic devices can be on a circuit board in the glasses. Or, some of the devices are in the glasses, while other in the base tethered to the glasses.

FIG. 11B shows another example of some of the electrical components in or tethered to a pair of glasses for wireless connections according to the present invention. In this embodiment, there does not need to have digital data. A speaker 620 and a microphone 622 are connected to an analog interface circuit 624, which is coupled to a RF transceiver circuit 626 and an antenna 628. For the speaker application, the transceiver circuit 626 mixes the RF signals down into IF signals, which are converted by the analog interface circuit 624 into analog signals for the speaker 620. Similarly, for the microphone application, its analog signals are converted into the IF signals by the analog interface circuit 624 to be up converted by the transceiver circuit 626 into RF signals for the antenna 628. These types of circuitry are suitable for, such as, simple radios, analog cell phones, CB radios, walkee-talkees, police radios or intercom systems.

In one embodiment, most of the electrical components are not in the glasses. The pair of glasses includes an antenna to capture the wireless signals, and a connector. The wireless signals captured are transmitted through the connector to electrical circuits external to the glasses.

A number of processors have been described. The processors can use different types of operating systems. In one embodiment, Symbian Operating Systems are used. In another embodiment, operating systems, such as TinyOS, are used. The operating system could be programmed in C++ and then compiled into machine codes.

For privacy protection, signals can be encrypted before transmission. Encryption can take significant computation power, and may generate a fair amount of heat. In one embodiment, encryption capabilities are located in a base tethered to the glasses. There can be a fan inside the base. The fan can be turned on during encryption. In another embodiment, the fan is activated during other high capacity uses for heat dissipation purposes.

In yet another embodiment, there is a fan in the glasses. The fan is located at a temple of the glasses, in the region close to its lens holder. The fan is used to cool the wearer of the glasses.

In one embodiment, a pair of glasses has access to voice recognition software. The software can be embedded in (a) the glasses, (b) a base tethered to the glasses, (c) a portable device wired or wirelessly coupled to the glasses or to the base, or (d) a computing system wired or wirelessly coupled to the glasses. Or, the software or firmware can be in more than one of the above devices.

Glasses that can couple to signals wirelessly can be used in different applications. For example, the glasses can be a cell phone wireless head set, such as a Bluetooth cordless headset. Such short-distance wireless technologies allow the headset to connect to the user's cell phone without a wire. This would allow the user to drive, eat or perform other functions without getting tangled in a pesky wire.

In one embodiment, the cell phone is a VOIP (voice over Internet protocol) phone.

In one embodiment, for the glasses operating as a cell phone head set, the head set includes active noise cancellation mechanism. For example, the glasses include two microphones. One microphone is for capturing the voice of the user. But the microphone captures ambient noise also. It can be embedded in a protrusion extending from the end of the temple close to a lens holder, towards the mouth of the user, as the microphone 110 in FIG. 1. Another microphone can be located at the top of one of the lens holders pointing away from the mouth of the user. This microphone is for capturing ambient noise. As a first order approximation, outputs from the two microphones could be subtracted from each other to provide voice signals with noise reduced.

In yet another embodiment, the glasses with wireless coupling capabilities also have a multimedia asset player, such as a MP3 player. The glasses can be used to receive music directly in digital format over, for example, a data-capable network of a mobile operator. The music can be received, for example, at a speed of 16 Kbits per second, providing sound quality close to compact disc. If the music is transmitted in a compressed manner, such as in a MP3 format, then the music data can be received at a much lower speed. In one embodiment, the glasses also have a microphone and can serve as a cellular phone or a wireless headset of a cellular phone.

In yet another embodiment, the glasses can serve as a radio, again through electrical components in or tethered to the glasses. In this embodiment, the glasses can include a tuner with one or more control knobs. The knobs can be used to select channels and to set the volume.

In one embodiment, a pair of glasses allows personalization by including a preference indicator. The indicator allows a user to provide his preference, such as on whatever is being output by the glasses. In one example, the glasses also has a radio having a speaker and with electrical components for wireless connection. In this example, the indicator can be used by the user to provide his preference regarding whatever is being played by the radio at that time. This preference can be wirelessly transmitted from the glasses to a third party. To illustrate, when the user is listening to a piece of music, the user can indicate he likes the piece of music by pressing a control knob on the glasses. This piece of preference information is then transmitted and received by a service provider, which is then informed of the user's preference. Instead of a control knob, in another embodiment, the preference indicator is a system with a microphone and voice recognition software. The user can indicate his preference vocally.

In another example regarding the personalization process, the glasses can serve as a multimedia asset player, such as a MP3 player. The song that the user has shown preference can be stored in a storage device, which can be in the glasses.

Figure 12:
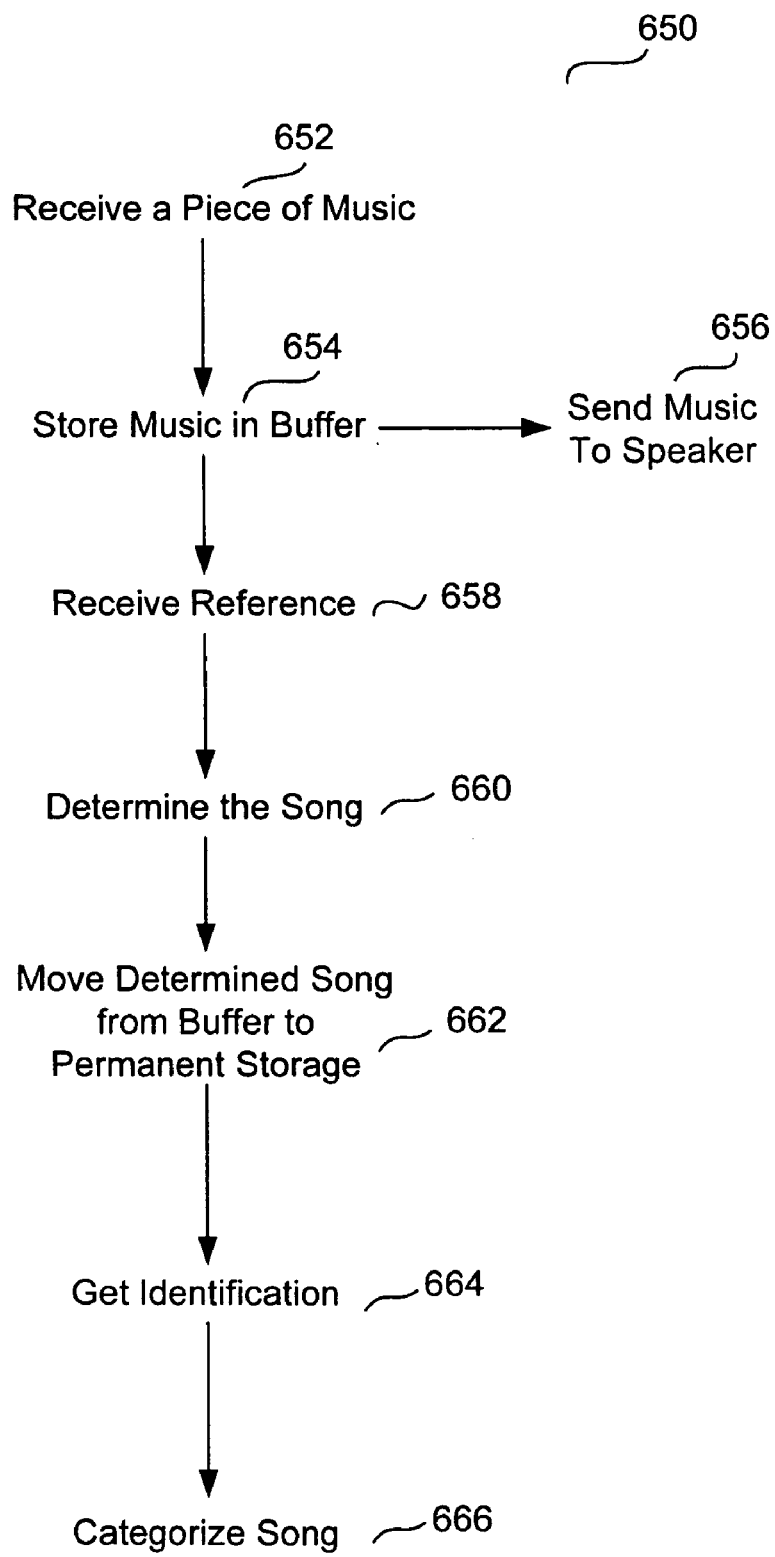
FIG. 12 shows a process for a personalized radio according to one embodiment of the present invention.

FIG. 12 shows a process 650 according to one embodiment of the present invention for a personalized radio.

Initially, a pair of glasses according to the present invention receives 652 a piece of music from a radio station. That piece of music is stored 654 in a buffer or a temporary storage area. This temporary storage area can be in the glasses or tethered to the glasses. The piece of music is also sent 656 to a speaker in the glasses.

Assume that the user likes the music. Based on the preference indicator, the user shows his preference. After the glasses receive 658 an indication of the user's preference, the glasses determine 660 the song corresponding to the indication. That piece of music can then be moved 662 from the buffer to a permanent storage area, such as into a flash memory. This would then allow the user to subsequently access the piece of music.

There are different ways to determine 660 the song or the content being played by the radio corresponding to the indication. For example, one rule is that when the user pushes the preference button or voices his preference, the song (or media asset or media file) that is being played is the one the user likes. Since the operating system knows what song is being played at what time, based on the rule, the song of preference is determined. Another rule is that when the user shows his preference, and there is no song being played at that instance, the song immediately preceding the break is the song of preference.

In another embodiment, the glasses can get 664 an identification for the song of preference. For example, the glasses can ask the user to provide an identification for the piece of music. This identification can be the type of music, the singer, the name of the music or other identification. In another embodiment, there can be meta data embedded, such as in the beginning part of the music (or media asset). Having such meta data embedded is not uncommon for music in digital format. The meta data can include identifications for the music. The glasses can get 664 such identification. Based on the identification, the song is categorized 666 accordingly, such as grouped with other songs having the same identification. Such categorization process would enhance the ease of accessing the song by the user at a later time.

Figure 13:
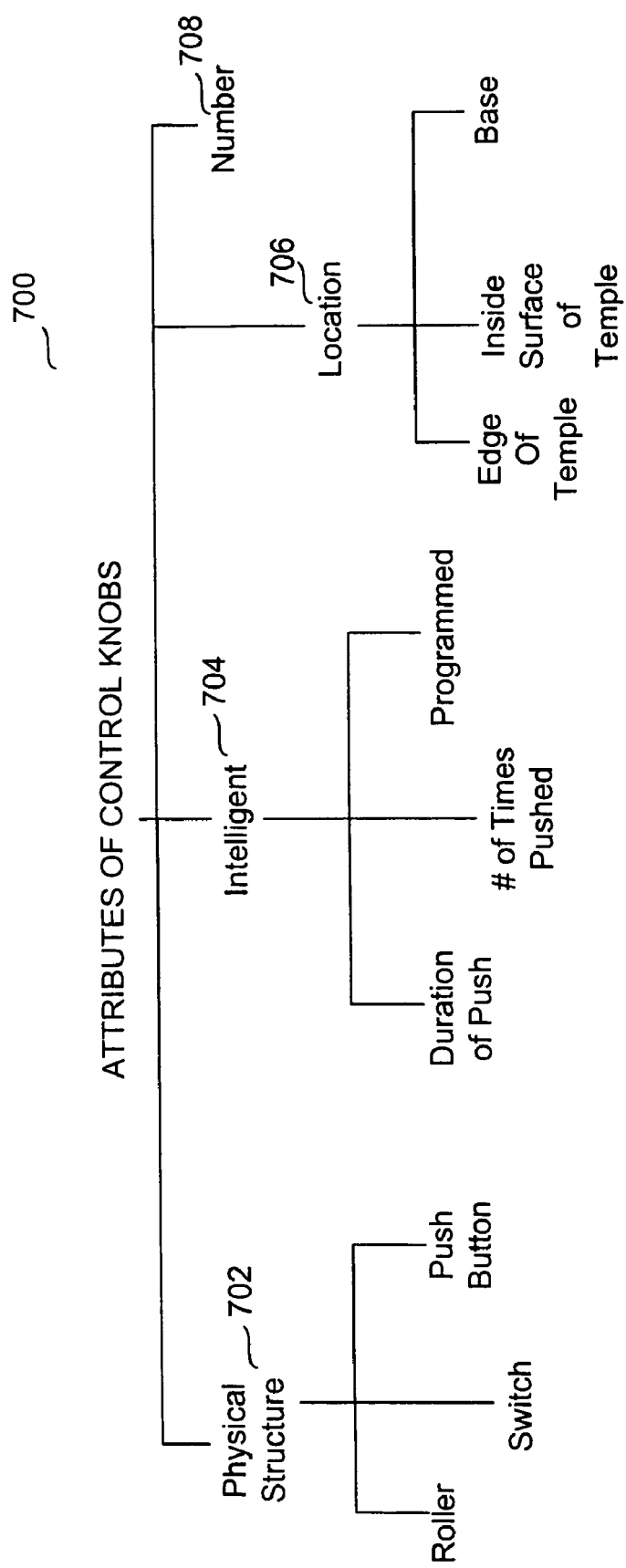
FIG. 13 shows a number of attributes of control knobs according to different embodiments of the present invention.

A number of control knobs have been described. FIG. 13 shows a number of attributes 700 regarding control knobs according to the present invention. The knobs can be of different physical structure 702. For example, a control knob can be a roller, a switch or a push-button. A control knob serving as an up/down controller can use two buttons, or a roller.

A control knob can be more intelligent 704. For example, a push-button control knob can serve different purposes depending on the duration the knob is being pushed. If a user pushes it for more than three seconds, the knob serves as an on-off toggle switch. In another example, a knob can serve multiple purposes, and the specific purpose depends on the number of times the knob is pushed.

A knob can also be programmed. A user can connect the glasses to a computer and program the knob accordingly. For example, one can program a knob such that if the knob is pushed more than three seconds, the knob would serve as an on/off switch for the glasses.

The location 706 of a control knob can vary for different applications. A control knob can be located on the glasses. A control knob can be on the top, the side or the bottom of the temple. A control knob can be located at the inside of a temple facing the user. Assume that there are a number of control knobs and all of them are on the edges of a temple, except one. By being at a position different from other control knobs, this knob can serve a specific purpose. For example, it can be an on/off control knob. In yet another embodiment, a control knob can be located in a base tethered to the glasses.

The number 708 of control knobs can vary depending on operations. For example, there is an on/off control knob and a volume up/down control knob. If the glasses are used for cell phone headset application, in one embodiment, there is also an answer/hang-up control knob. If the glasses serve as a radio, in one embodiment, there is also a tuning control knob, which can be two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a save-this-song control knob, a skip-forward/backward-song control knob and a select-song-to-play control knob.

A number of embodiments of the present invention have been described regarding audio signals. In one embodiment, the glasses further serve as a camera.

Figure 14:
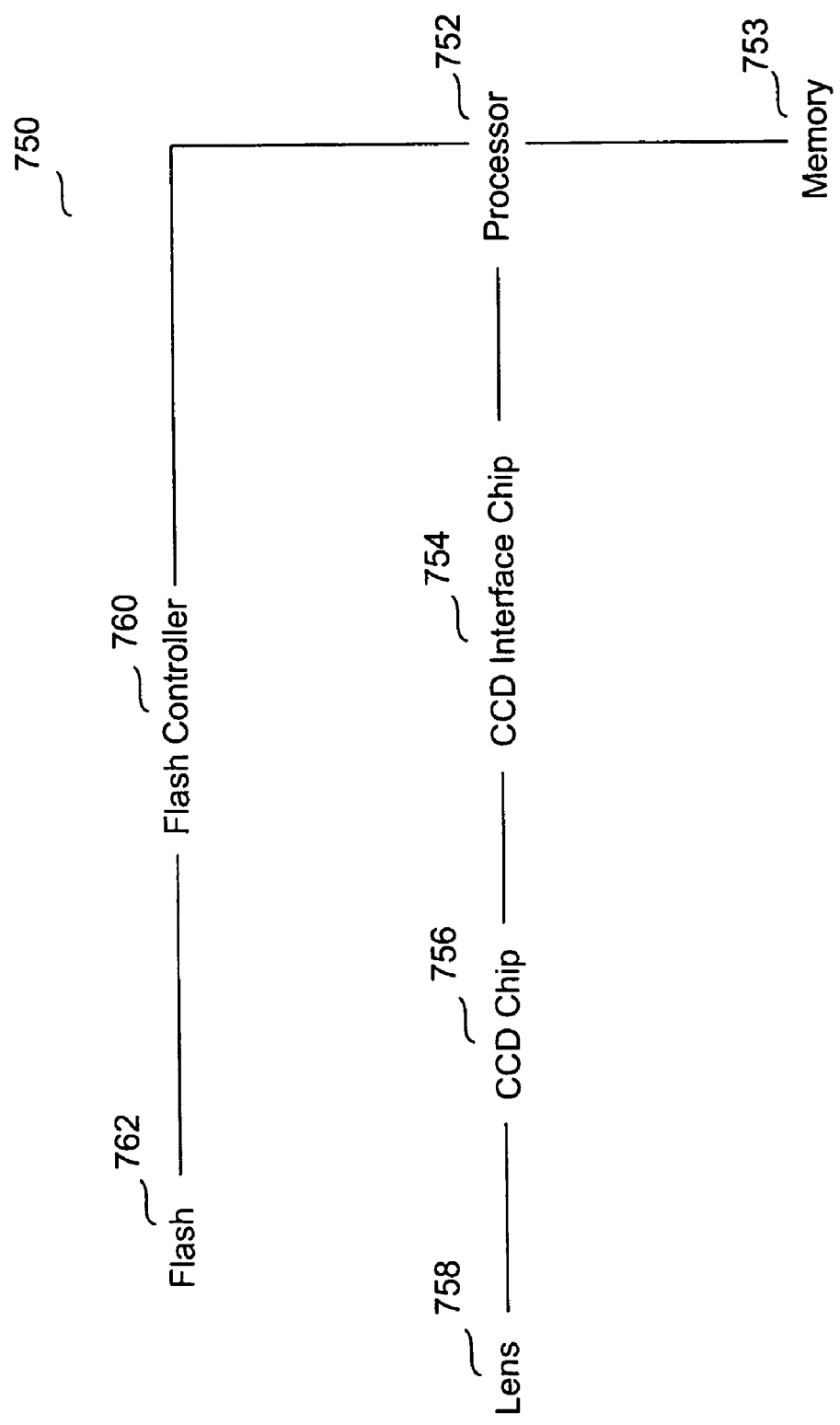
FIG. 14 shows some of the electrical components for capturing images with a pair of glasses according to an embodiment of the present invention.

FIG. 14 shows one embodiment of electrical components in a pair of glasses with image capturing capabilities. A processor 752 is coupled to a CCD interface chip 754 and then to a CCD chip 756. Images focused by a lens 758 are captured and collected by the CCD chip. In another embodiment, there is also be a flash controller 760 connected to the processor 752 to control a flash 762.

In one embodiment, a number of pixels of the CCD chip 756 are used as light sensors. The pixels can be used to adjust the sensitivity of the CCD chip 756 based on the amount of ambient light. For example, if the outside environment is dim, it would take a longer period of time to collect enough charges by the CCD chip 756 to re-create the image. This implies that the integration time of the CCD chip 756 should increase.

In yet another embodiment, the camera can pertain to a video camera. The capacity of the memory 753 increases so as to store the video images.

In one embodiment, the glasses do not offer adjustment on the image distance. The CCD chip 756 can be located, for example, at the focal point of the lens 758. In another embodiment, there is an image distance control knob. For example, a mechanical lever can be pre-programmed or pre-set to move the lens to one or more different positions. One position can be for close-up shots, such as objects from 2 to 4 ft, and another for scenic or vista images, such as objects greater than 6 ft.

Depending on the embodiment, electrical components of a camera can be in a pair of glasses, and/or a base tethered to the glasses, and/or a portable device tethered to the glasses or to the base. For example, the memory 753 can be in the base tethered to the glasses.

The location of the lens 758 can vary depending on the embodiment. In one embodiment, referring to FIG. 1, one location is at the bridge of the glasses, with the lens of the camera facing forward. In this situation, what the user sees is substantially what the captured image would be. In other words, in a general sense, what the user sees is what the user gets. With such an embodiment, it is relatively easy for a user to take pictures, hands-free. In another embodiment, another location for the lens 758 are at a side portion adjacent to a lens holder, before the joint of the corresponding temple, such as at 116 in FIG. 1. Again, the lens of the camera faces forward. Some of the electrical components of the camera can be in that location, and other components in the temple 104. These components are electrically connected through one of the joints, such as with a flexible pc board. In yet another embodiment, the lens 758 can face sideways and outwards in a temple of a pair of glasses, towards the left or right side of the user.

Regarding storing the images, in one embodiment, the images are stored locally. One approach to determine which image to store is the first-in-first-out approach. Once the camera is turned on, the camera takes pictures continually in an automatic mode, such as once every few seconds. When the memory becomes full or under other pre-set or pre-programmed condition, the first picture stored will be deleted when the next picture comes in. In another embodiment, the digital content in one picture is compared to the digital content in, for example, the fifth picture further down. If the difference between the two is not more than a pre-set threshold, the four pictures in between will be deleted. One approach to determine the difference is by comparing the total charges collected by the CCD chip for the two images. If the two sets of charges do not differ by more than a certain threshold, the images in between would be deleted.

The images captured can also be stored at a remote site. For example, the glasses can upload the images to a computer, wirelessly or through a wired connection from a connector at the glasses.

Figure 15:
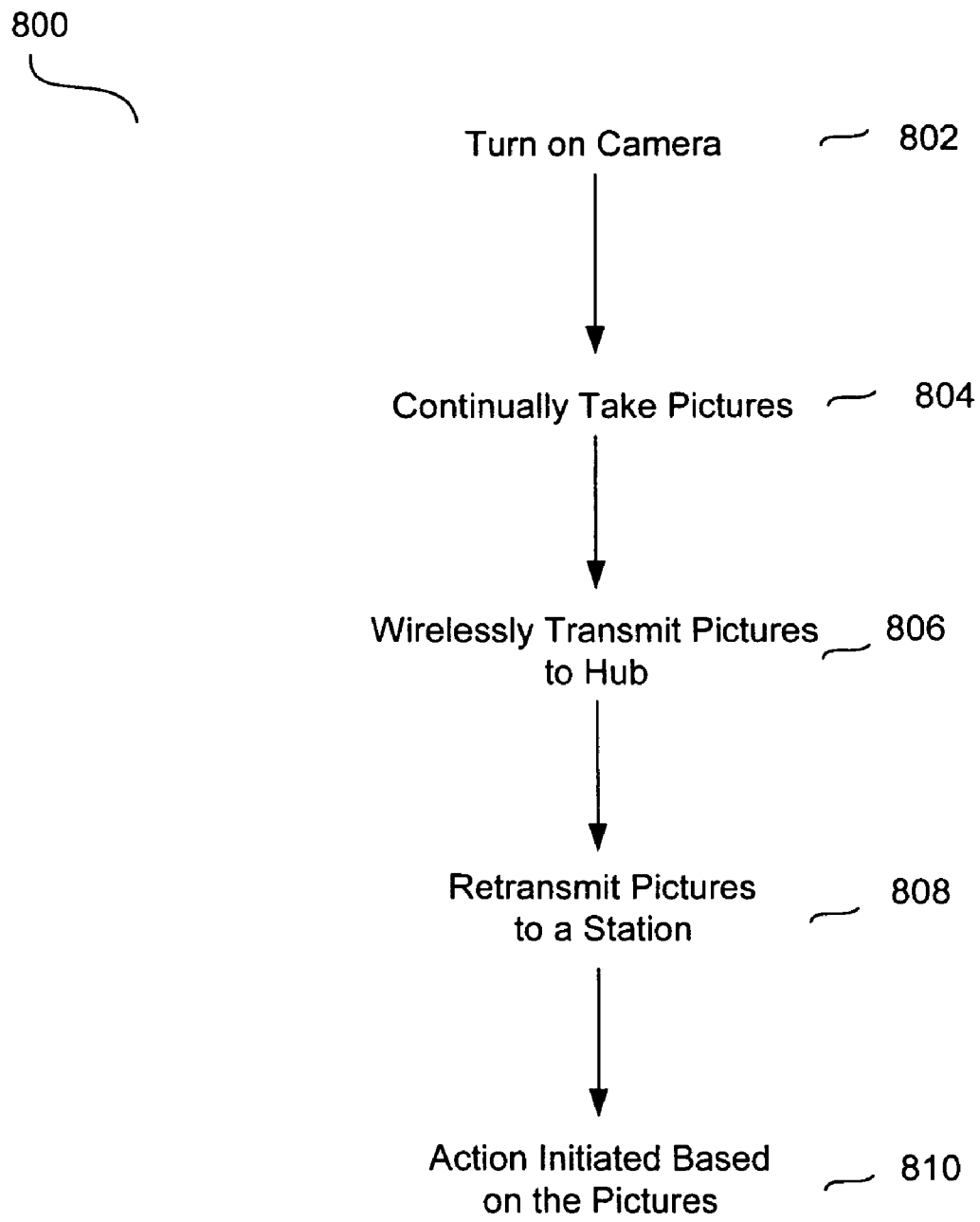
FIG. 15 shows an operation of taking actions based on images captured with a pair of glasses with wireless transceiver capability according to one embodiment of the invention.

FIG. 15 shows an operation 800 of taking certain actions based on images captured by a pair of glasses with a wireless transceiver, according to one embodiment of the invention. This operation can be used by a police officer on patrol. Before the officer gets out of his patrol vehicle to confront a suspect, the officer can inform the station. At that point, the camera is turned on 802.

There can be different approaches to turn on the camera. In one embodiment, an operator at the station can remind the officer to turn on the camera. Or, the operator can remotely turn on the camera. In yet another embodiment, the camera can be automatically turned on under certain condition. One such condition is that if the camera is out of the patrol vehicle, the camera is automatically turned on. With the glasses having the capability to wirelessly communicate with the patrol vehicle, one method to detect if the glasses are out of the patrol vehicle is based on the wireless signal strength of the glasses. The patrol vehicle can detect the signal strength of the wireless signals, which depends on the distance between glasses and the vehicle. A threshold can be set. If the signal strength is below the preset threshold, the glasses would be assumed to be out of the car, and the camera would be automatically turned on.

After the camera is turned on 802, the glasses start to continually take 804 pictures, such as once every few seconds. The pictures taken are automatically transmitted back 806 to the patrol vehicle in a wireless manner. In this situation, the patrol vehicle serves as a hub, which stores the pictures. Then, the hub re-transmits 808 the pictures back to the station. Note that the pictures can be compressed by standard algorithms before they are transmitted. This compression mechanism can be performed by a computer in the patrol vehicle. When the station gets the pictures, they are de-compressed before being viewed, such as by the operator. The pictures enable the operator at the station to see what the officer is confronting. This effectively allows the operator at the station to perform real-time monitoring of or for the officer. If it is a high risk situation, the operator can quickly react 810, such as by dispatching additional support for the officer. In one embodiment, the glasses can include not only a camera but also a microphone for audio pickup, such as sounds from the officer, suspect, witness or environmental sounds (such as door opening, gun shot, etc.).

Regarding ownership of the glasses, the user can own the glasses. In one embodiment, the user leases the glasses from a provider. For example, the user leases a ski goggle with a camera. After the user turns on the camera, as the user skis, the goggle automatically takes pictures. Later, the user can return the goggle to the provider or a kiosk, where the pictures can be retrieved and/or stored. Alternatively, the goggle can include a wireless transceiver and the images could be uploaded continually or automatically to the provider or the kiosk via a wireless network. The provider or the kiosk can transmit the images to a website, such as a website associated with the user. In another embodiment, the user picks up hardcopies of the images, e.g., a CD with the images or a DVD with the video, from the provider or the kiosk.

In one embodiment, the glasses allow the user to enter his identification. This can be done, for example, through a control knob at the glasses. Such identification is then linked to the images. Based on the identification, the user can return to the provider or kiosk at a subsequent time to pick up the images previously left behind.

Figure 16:
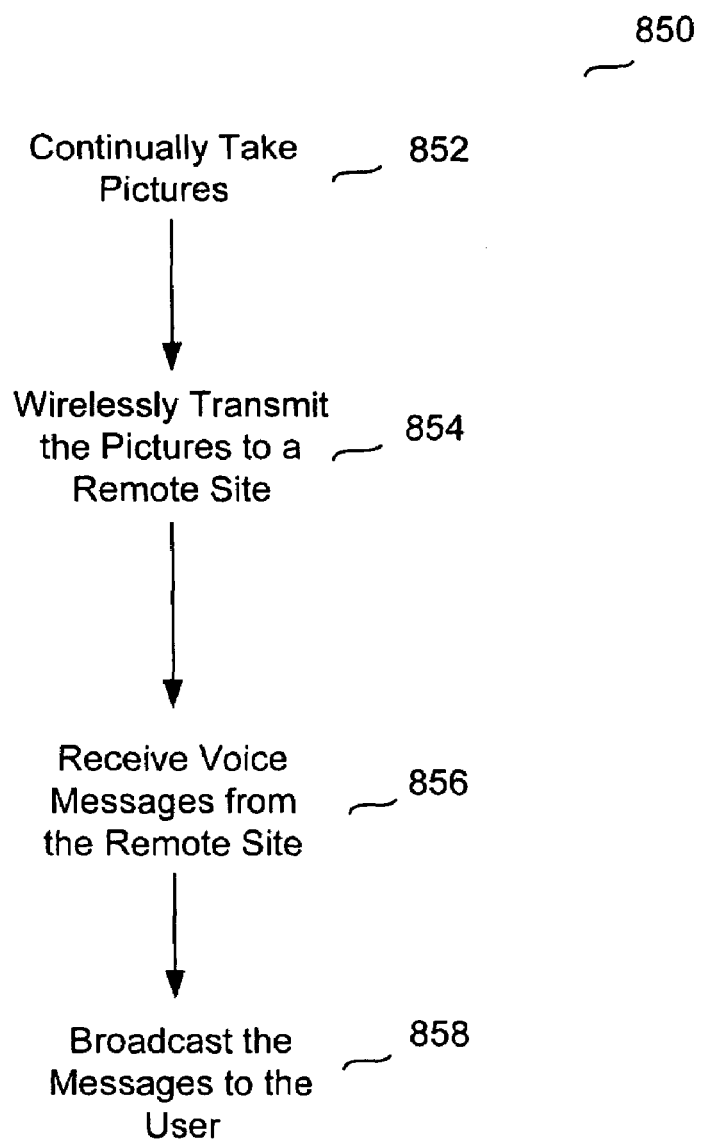
FIG. 16 shows an operation to provide messages to a user based on images captured by a pair of glasses according to an embodiment of the present invention.

In yet another embodiment, the pair of glasses with a camera also has a speaker and a wireless transceiver. It can be used to remotely control or direct the user wearing the glasses. FIG. 16 shows one such operation 850 according to one embodiment.

To illustrate the operation 850, assume that the user is a paramedic helping a patient. The glasses continually take pictures 852 of objects directly in front of the paramedic, such as images around four feet away from the eyes of the paramedic. The pictures are wirelessly transmitted 854 to a remote site, such as a hospital, to be viewed by a doctor. Again, this transmission can be a two-step process. For example, pictures can be transmitted to the paramedic's ambulance, which can then re-transmit to the remote site. The first transmission from the glasses to the ambulance can be through a low-power, short-range, broadband, wireless transmission protocol. The second transmission from the ambulance to the hospital can be through a much longer-range, higher power, broadband, wireless transmission protocol. Again, compression and de-compression techniques can be used to enhance the rate of transmission by reducing the amount of data to be transmitted.

Based on the images, the doctor sends out voice messages to the paramedic. These messages are wirelessly transmitted to and received 856 by the glasses. The speaker in the glasses outputs 858 the messages to the paramedic.

In another embodiment, the glasses also have a microphone, which allows the paramedic to communicate directly with the doctor also.

In one embodiment, the glasses can take pictures and can be a multimedia asset player. Pictures and the multimedia assets can share the same memory storage device. In this situation, the capacity for the multimedia assets and pictures can be interrelated. For example, a user can take more pictures if there are less multimedia assets, such as fewer songs in the storage device.

A number of embodiments have been described regarding electrical components in the temples of glasses. The locations selected are for illustration purposes. In other embodiments, some of the components are embedded fully or partially in other areas of the glasses, such as the lens holders or the bridges of the glasses. For example, there are glasses where there are shields at the edges of the lens holders of the glasses. These shields can wrap around, or better conform to the profile of, the face of the wearer. There can be transparent or translucent windows on these shields also. The shields are not limited to be in primary frames. They can be in, for example, fit-over glasses, auxiliary frames or safety glasses. To illustrate, in fit-over glasses, such shields can go over or cover at least a portion of the primary frames. One or more electrical components can be in such shields.

Note that in one embodiment, a pair of glasses does not have to include lenses. Also, a number of embodiments have been described with a pair of glasses tethered to a base. In one embodiment, a pair of glasses includes a base and a cord connecting the base to the glasses.

Figure 17A:
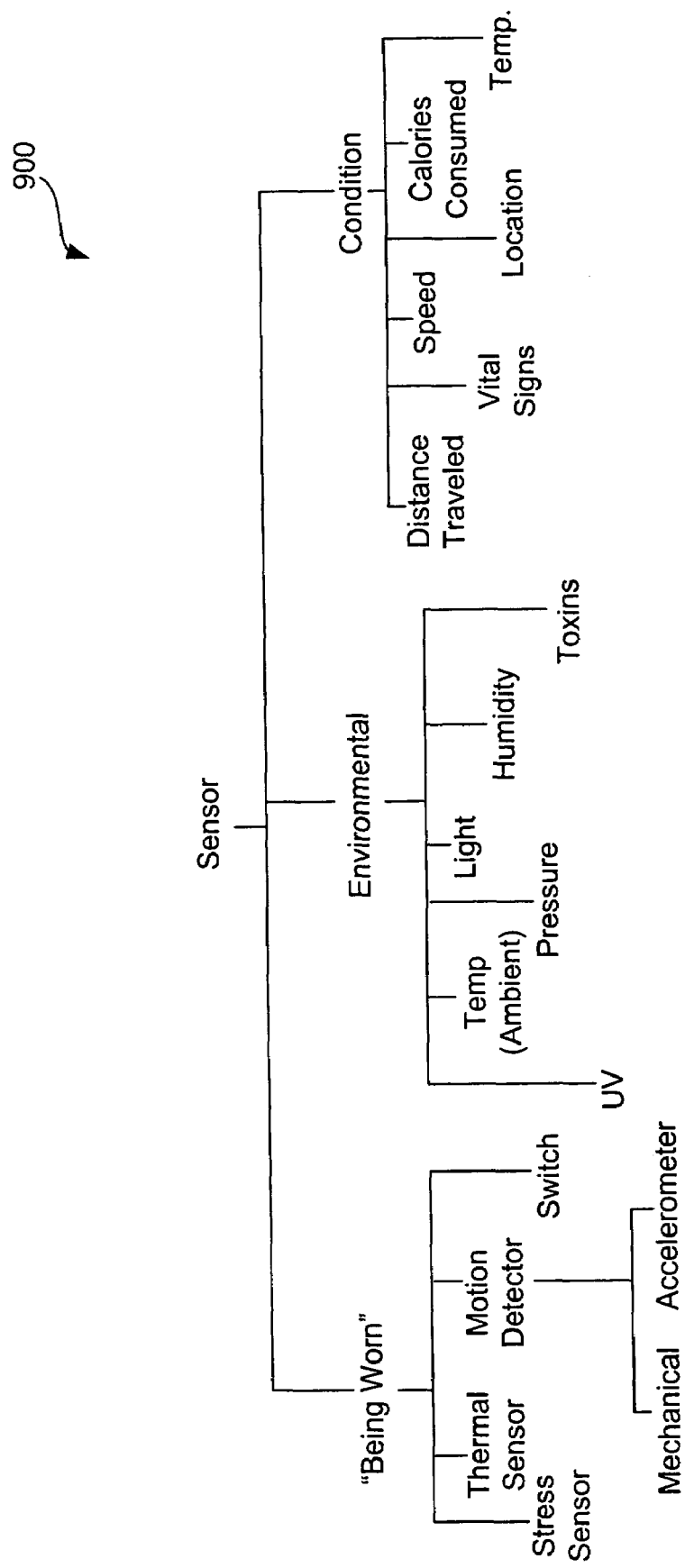
FIG. 17A is a chart that depicts examples of sensors in a pair of glasses according to different embodiments of the present invention.

In yet another embodiment, a pair of glasses also includes a sensor. FIG. 17A is a chart 900 that depicts examples of sensors in the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the eyewear is assumed to be worn. The motion detector can, for example, be achieved by a mechanical means or an accelerometer.

In another embodiment, the "being worn" sensor includes two thermal sensors. One sensor can be at approximately the middle of a temple, such as in a region that touches the head of the user wearing the glasses. The other sensor can be at the end of the temple, close to its hinge. If the temperature differential between the two sensors is beyond a certain preset value, the eyewear would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is fully extended outwards, the switch is turned on. The switch can be a pin. When the temple is fully extended outwards, the pin is pressed. When both temples are fully extended outwards, in one embodiment, the glasses would be assumed to be worn by the user.

In one embodiment, another type of sensor is an environmental sensor. The environmental sensor can sense environmental conditions, such as one or more of ultraviolet radiation, temperature (e.g., ambient temperature), pressure, light, humidity and toxins (e.g., chemicals, radiation, etc.).

In another embodiment, another type of sensor is a condition sensor. The condition sensor can sense the conditions of the user of the glasses. Examples of physical sensors include sensing one or more of distance traveled, location, speed, calories consumed, temperature and vital signs associated with the user of the glasses. The distance traveled could represent the horizontal distance traveled or the vertical distance (i.e. elevation) traveled. The speed can be the rate of movement along the horizontal distance traveled and/or the vertical distance. In yet another embodiment, the condition sensor can sense the emotional conditions of the user of the glasses.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The sensors can by powered by a battery, solar energy, or kinetic energy. For reduced power consumption, the sensors can remain in a low-power state unless data is being acquired by the sensors. In yet another embodiment, two or more of the auxiliary sensors can communicate with one another (wired or wirelessly) to exchange data or control information.

A number of embodiments have been described regarding one or more electrical components at least partially embedded in a pair of glasses. In one embodiment, one or more electrical components are at least partially embedded in a temple tip of a pair of glasses. Temple tips are particularly common for wire or metal frames. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the tip. There can also be a connector, such as the connector 300 shown in FIG. 5, at the temple tip. In another embodiment, the temple tip can include a female connector, which can be similar to the female connector 310 shown in FIG. 6B. As the temple tip grabs onto the main body of the temple, the female connector can make electrical contact with a male connector at the main body of the temple. Typically, particularly before a pair of glasses has been extensively worn, the temple tip can be removed and re-inserted back on to the main body of the temple without a lot of difficulties. Such a temple tip can be an after-market component, with different temple tips having different electrical components to serve different functions.

Figure 17B:
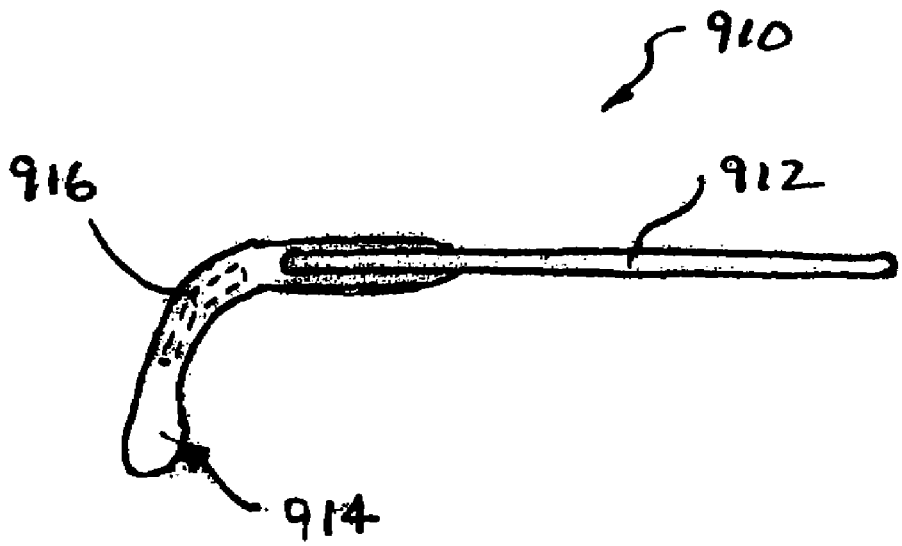
FIG. 17B is a diagram of a temple arrangement according to one embodiment of the invention.

FIG. 17B is a diagram of a temple arrangement 910 according to one embodiment of the invention. In this arrangement, a temple tip is not considered as a part of the temple. The temple arrangement 910 includes a temple 912 that is associated with a pair of eyeglasses. Over the end of the temple 912 that is opposite the associated lens holder, a temple tip 914 is provided. The temple tip 914 can be held to the temple 912 by frictional forces and/or adhesive. The temple tip 914 includes at least one electrical component 916 that is at least partially embedded therein. The temple tip 914 can be manufactured and delivered to resellers or retailers as such. Alternatively, the temple tip 914 can be separately provided as an optional replacement temple tip for an existing temple tip. Hence, as after manufacture, upgrade to the eyewear can be had through replacing the existing temple tip with the replacement temple tip. The colors and shapes of the temple tip 914 can vary widely. In the after manufacturing environment, the reseller or retailer can be provided with a range of different colors and shapes so that a user can receive a replacement tip that reasonably matches the color and shape of the temple or that provides an altered appearance as desired by the user.

Figure 17C:
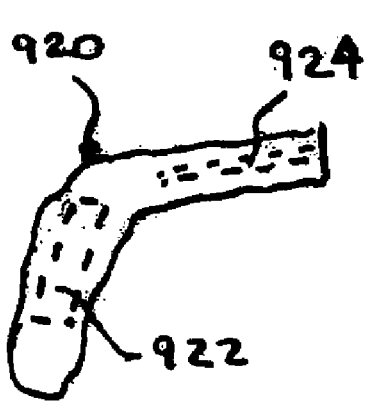
FIG. 17C is a diagram of a cover that at least partially covers a temple according to one embodiment of the invention.
Figure 17D:
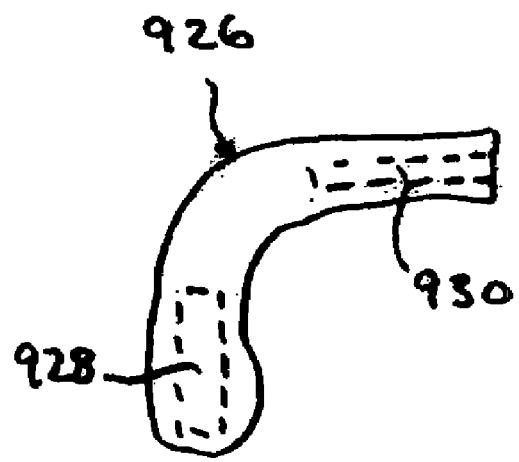
FIG. 17D is a diagram of a fit-over temple that at least partially fits over a temple according to one embodiment of the invention.

Besides a replacement temple tip such as illustrated in FIG. 17B, a temple tip can also be effectively modified by a fit-over temple or temple cover. FIG. 17C is a diagram of a temple cover 920 that at least partially covers a temple (e.g., temple 912) according to one embodiment of the invention. As another example, the temple cover 920 can be a fabric or other material, such as a sock or sleeve, that slides over and at least partially covers a temple tip. The temple cover 920 can include at one electrical component 922 that is either attached thereto or at least partially embedded therein. The temple cover 920 can also include an opening 924 so as to received a temple or a temple tip. The temple cover 920 can be held to a temple by frictional forces and/or adhesive. FIG. 17D is a diagram of a fit-over temple 926 that at least partially fits over a temple according to one embodiment of the invention. For example, the fit-over temple 926 can at least partial fit-over a temple tip. The fit-over temple 926 includes at one electrical component 928 that is either attached thereto or at least partially embedded therein. The fit-over temple 926 can also include an opening 930 so as to receive a temple. The fit-over temple 926 can be held to a temple by frictional forces and/or adhesive. As an example, the fit-over temple 926 can be plastic or other material. The colors and shapes of the fit-over temple 926 can vary widely. In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

In one embodiment, a fit-over temple or temple cover according to the invention can further include a connector or cable to facilitate electrical connection with the at least one electrical component that is either attached to a temple or a temple tip or at least partially embedded therein.

In one embodiment, an electrical component is a component of an electrical circuit, and the electrical circuit is for performing at least a desired, intended or predetermined function.

A number of embodiments have been described above for an eyeglass frame, i.e., primary frame, are also applicable to an auxiliary frame. An auxiliary frame can attach to a primary frame through different techniques, such as using clips. Another technique to attach an auxiliary frame to a primary frame is by way of magnets. Examples of using magnets as an attachment technique can be found, for example, in U.S. Pat. No. 6,012,811, entitled, "EYEGLASS FRAMES WITH MAGNETS AT BRIDGES FOR ATTACHMENT."

A number of embodiments have been described where one or more electrical components are at least partially embedded in a pair of glasses. In yet another embodiment, the one or more electrical components are at least partially embedded in an eye mask.

Figure 18:
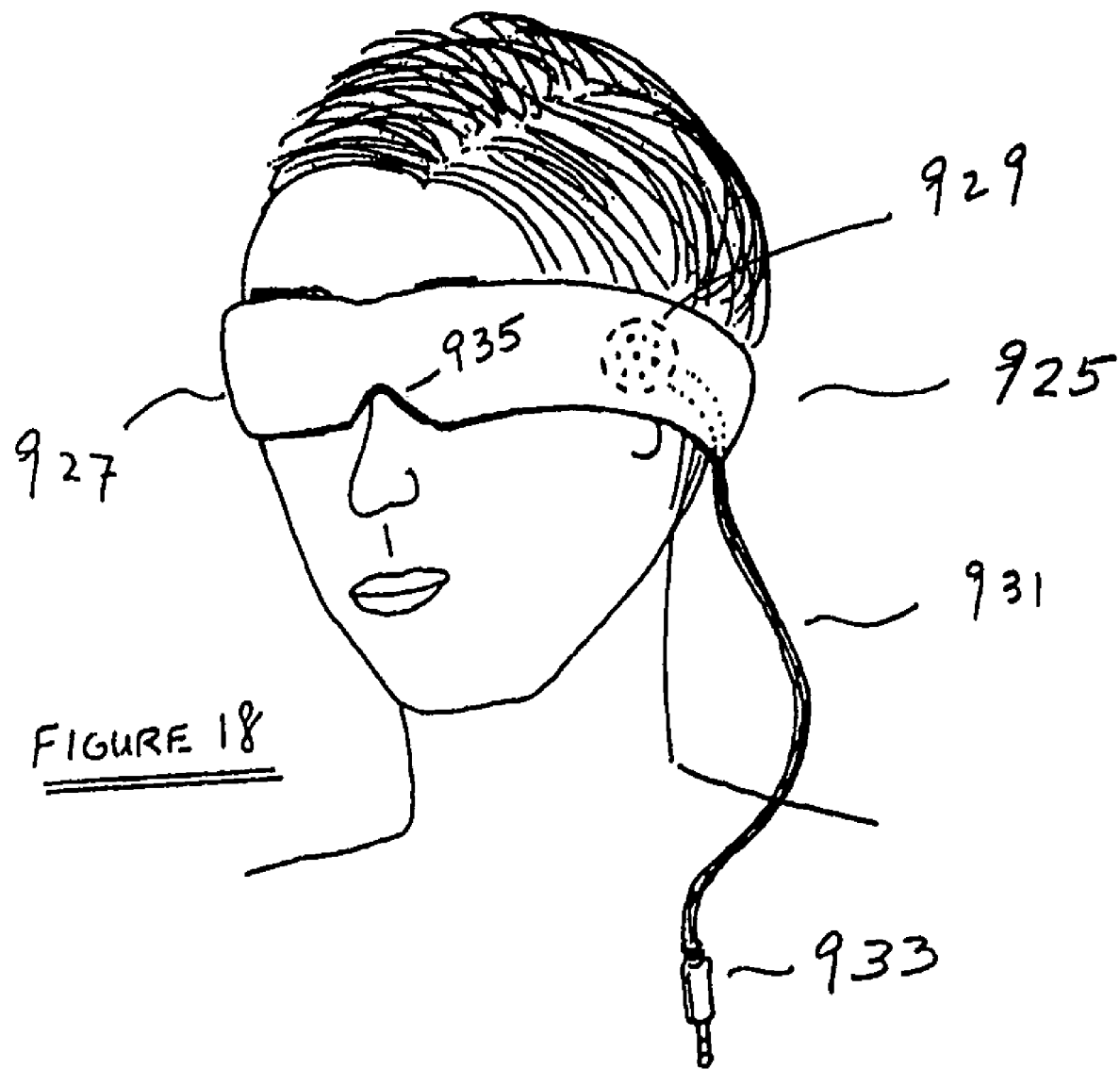
FIG. 18 shows an embodiment including an eye mask according to the invention.

FIG. 18 shows one embodiment 925 where one or more electrical components are at least partially embedded in an eye mask 927. The eye mask 927 includes a piece of fabric that is opaque so that when the mask is worn, the mask wraps around the eyes to block light from entering into the eyes of the user.

The embodiment 925 includes a wrapping mechanism to hold the fabric onto the head of a user so that when the mask is worn by the user, the mechanism allows the fabric to have a relatively tight and comfortable fit over the face of the user. In one approach the wrapping mechanism is achieved with the fabric in the shape of a band and having a certain degree of elasticity. When the mask is worn by the user, the elasticity of the fabric allows the mask to establish a relatively tight fit over the face of the user. In another example, the fabric is a long piece of material. The wrapping mechanism includes a clip or Velcro at the two ends of the piece of material to tie the two ends together. In another example, the wrapping mechanism includes two elastic pieces of elastic materials at the two ends of the fabric. To wear the mask, each elastic piece of material goes over one of the ears of the user so that the fabric establishes a relatively tight fit over the face of the user. In yet another embodiment, the mask 927 includes a notch 935 to accommodate the nose of the user. In another embodiment, there can be additional padding in the vicinity of the one or more electrical components so that if an electrical component is pressed against the user, the padding serves as a buffer or cushion.

In one embodiment, a speaker 929 can be at least partially embedded in the mask 927, and can be positioned close to and facing one of the ears of the user. The speaker 929, through an electrical connector, is electrically connected to a cable 931. The cable 931 can also have a connector 933 at its distal end. The connector 933 can be plugged into another device, such as a MP3 player or a CD player. After putting on the mask, with the connector 933 plugged into the another device, the user would be able to hear, for example, audio sounds such as music. The eyemask 925 can be applied to different areas. For example, the user can be on a plane, and would like to rest. The user can put on the eyemask 925, and plug the connector 933 into a media outlet at an armrest of her seat in the plane. Thus, the user can enjoy music while taking a rest. The embodiment 925 could also include a plurality of speakers, such as one for each of the user's ears.

In another embodiment, the eyemask 927 includes the speaker 929 and a battery that is electrically connected to the speaker 929. The battery can be in a pocket on the eyemask and can be replaceable. The battery can also be a rechargeable battery, such as a lithium-ion battery, and there is a connector at least partially embedded in the eyemask. The connector can be used to recharge the battery.

Figure 19:
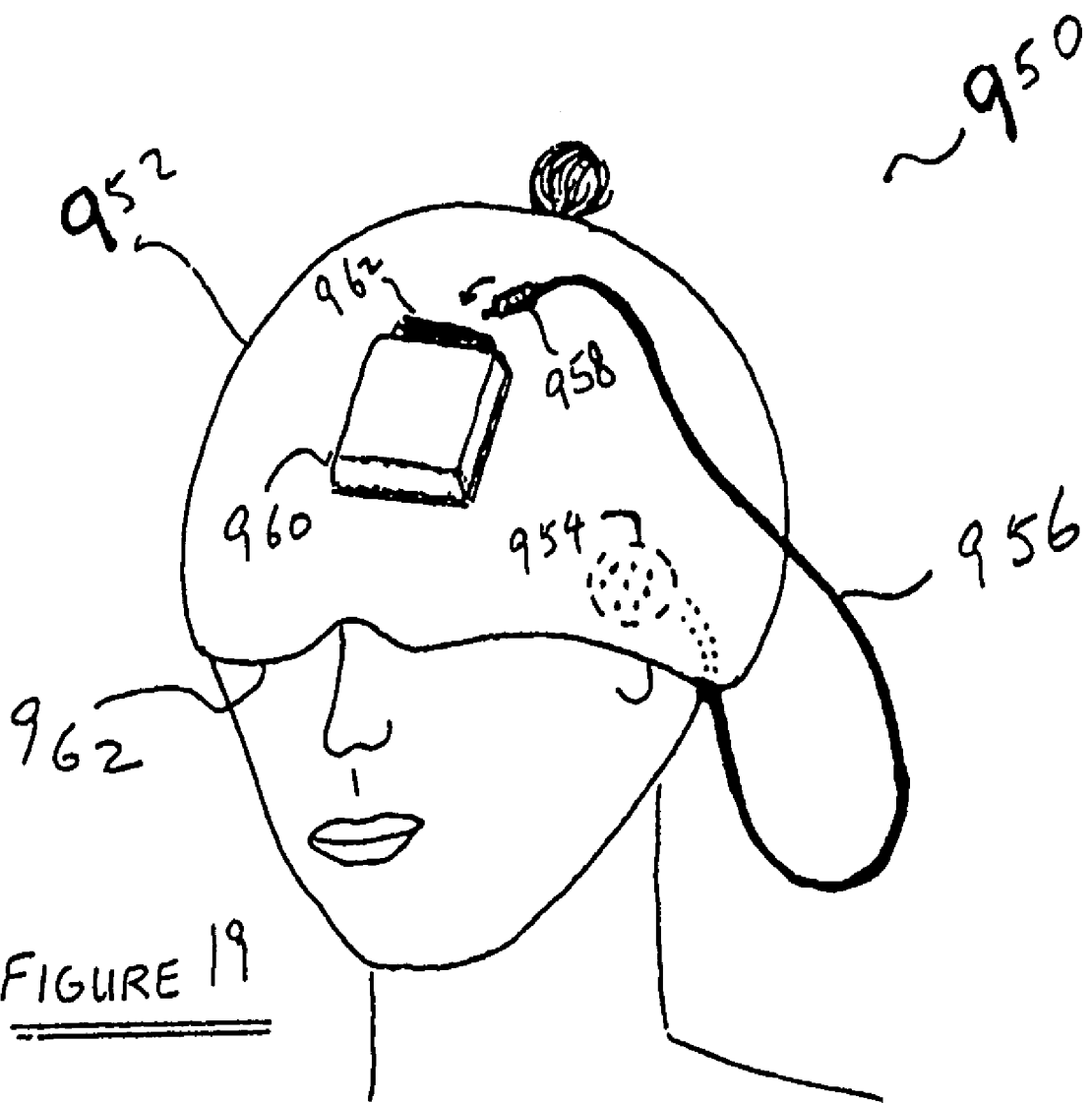
FIG. 19 shows an embodiment including a night cap according to the invention.

FIG. 19 shows another embodiment 950 where one or more electrical components are at least partially embedded in a night cap 952. In one embodiment, the cap 952 is at least partially made of fabric. In another embodiment, the cap 952 is entirely made of fabric. The cap includes a wrapping mechanism. When the cap is worn, the wrapping mechanism holds the cap onto the head of the user, and allows the cap to have a relatively tight and comfortable fit over the head of the user. Again the wrapping mechanism can be an elastic band at the base 962 of the cap 952. Or, the wrapping mechanism can include clips or Velcro as previously described.

The cap can include at least one speaker 954, which is at least partially embedded in the cap 952. When the cap 952 is worn by a user, the speaker 954 is positioned close to and facing one of the ears of the user. The speaker 954 can, for example, be electrically connected through a connector to a device 962 in a pocket 960 on the cap 952. The electrical connection can be through a cable 956 external to the cap 952. The cable 956 also can have a connector 958 to be plugged into the device 962. In another embodiment, the cable 956 is embedded in the cap. The device 962 can be an asset player, such as a MP3 player, with a battery. Through the connector 958, audio signals from the device 962 can be received by the speaker 954 and heard by the user. There can be one or more additional pockets on the night cap for one or more additional electrical components. When worn, the night cap does not have to cover the eyes of the user. In yet another embodiment, when worn, the night cap further covers the eyes of the user, as shown in FIG. 19. In one embodiment, the embodiment 950 further includes padding in the vicinity of an electrical component to serve as a buffer or cushion between the user and the electrical component.

A number of embodiments have been described involving a speaker in an eyemask or a night cap. In one embodiment, the audio output from the speaker can serve to cancel the environmental sounds in the vicinity of the user. For example, if the user is on an airplane, the surrounding environmental sound has a relatively high level of white noise. This white noise can be detected by a pickup device and cancelled by noise cancellation circuitry provided within the eyemask or night cap. Namely, the audio output from the speaker serves to cancel the white noise of the user's environment. In another embodiment, the electrical component embedded or partially embedded is not a speaker, but can be a sensor, which can sense a physiological function of the user.

Figure 20A:
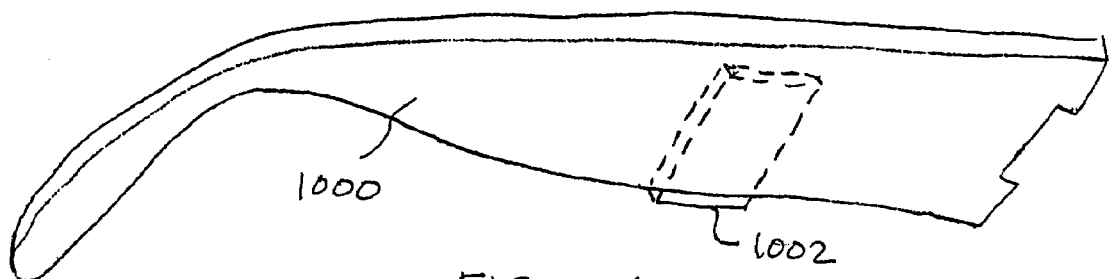
FIG. 20A is a diagram illustrating a temple having a slot for receiving a removable electronic device according to one embodiment of the invention
Figure 20B:
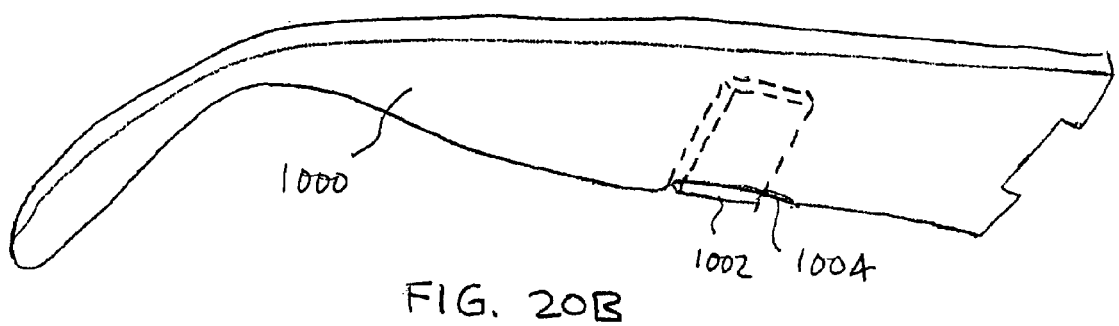
FIG. 20B is a diagram illustrating the temple having a recessed lower portion according to another embodiment of the invention.

FIG. 20A is a diagram illustrating a temple 1000 having a slot for receiving a removable electronic device 1002 according to one embodiment of the invention. In one example, the removable electronic device 1002 can be a memory storage device, sometimes referred to as a memory card. As shown in FIG. 20A, the removable electronic device 1002 is inserted into the slot. Although the slot could be electrically nonfunctional, typically the slot provides an avenue for the removable electronic device 1002 to be physically and electrically connected to electrical circuitry within the temple 1000 or elsewhere within the eyeglass frame. FIG. 20B is a diagram illustrating the temple 1000 having a recessed lower portion 1004 according to another embodiment of the invention. The recessed lower portion 1004 facilitates the insertion and removal of the removable electronic device 1002. In either embodiment, the removable electronic device can be manually inserted and removed or can use more complicated mechanical mechanisms to assist with the insertion and removal (e.g., spring-based push and release structure).

Figure 21A:
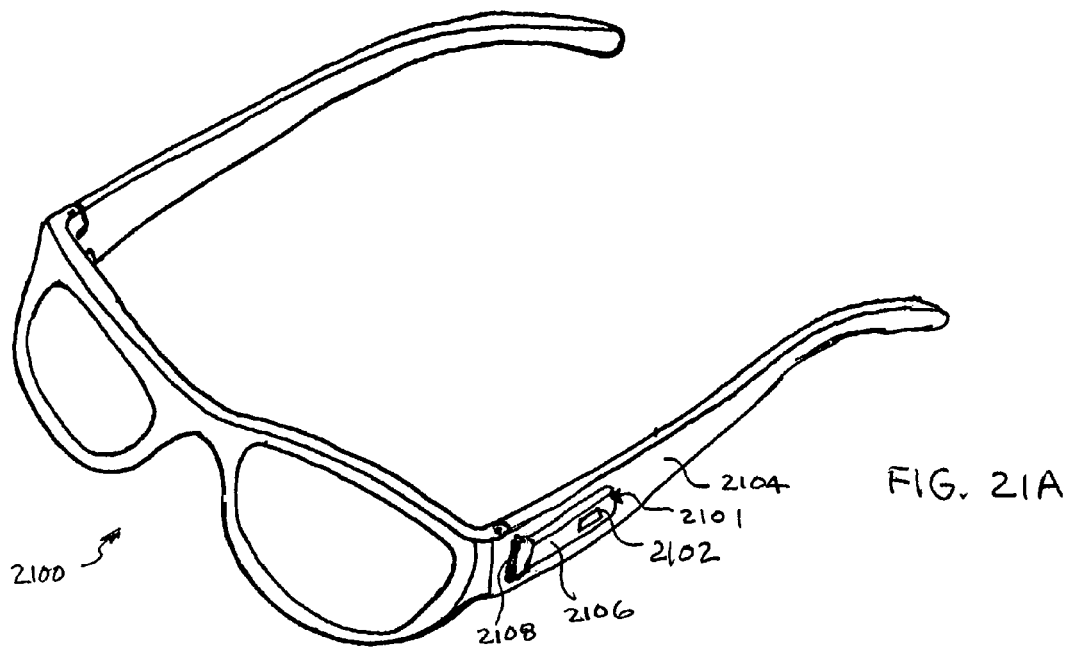
FIGS. 21A and 21B are diagrams illustrating a pair of glasses having a camera coupled thereto, according to one embodiment.
Figure 21B:
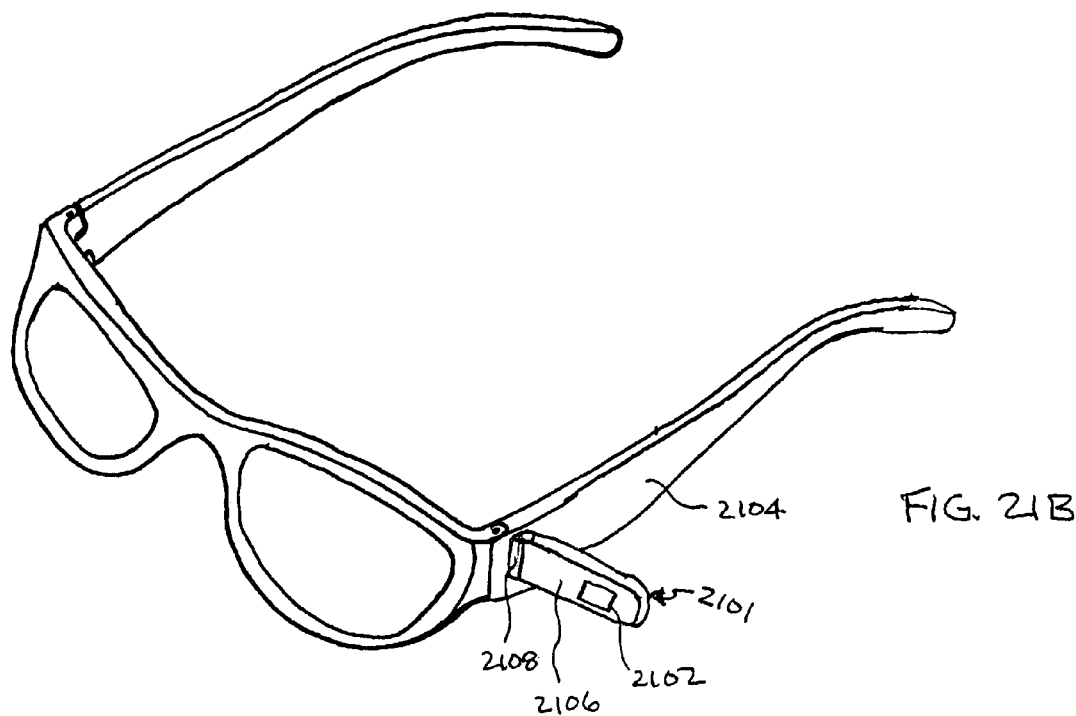

FIGS. 21A and 21B are diagrams illustrating a pair of glasses 2100 having a camera 2101 coupled thereto, according to one embodiment. The camera includes an image sensor 2102 and a camera housing 2106 (also referred to as a camera support arm). In this embodiment, the camera 2101 is rotatably coupled to an exterior surface of a temple 2104 of the pair of glasses 2100. The camera support arm 2106 is attached to the temple 2104. The camera support arm 2106 can couple to the temple 2104 using a hinge 2108. In one implementation, the hinge 2108 can use a spring or cam mechanism so that the camera support arm 2106 is held either against the temple 2104 when not in use or held in an open or extended position when in use. FIG. 21A illustrates one position of the camera support arm 2106 when the camera 2101 is not in use. FIG. 21B illustrates one position of the camera support arm 2106 when the camera 2101 is in use. The presence of the camera 2101 with the pair of eyeglasses 2100 enables a wearer of the pair of eyeglasses 2100 to take pictures of what the wearer is looking at. It should be noted that other supporting circuitry such as data storage for pictures, switches, battery, and electronics for the camera 2101 can be in the temple 2104, in the camera support arm 2106, elsewhere in the pair of glasses 2100, or even tethered thereto. However, in one implementation, the camera 2101 is completely self-contained in the camera housing 2106. In one embodiment, the hinge 2108 can also serve as a switch to turn the image sensor 2102 on or off.

In one implementation, to improve overall appearance of the pair of glasses 2100, the temple 2100 can provide a recess for receiving the camera support arm 2106 when the camera is not being utilized. Such may improve the aesthetic appearance of the pair of glasses 2100.

In another implementation, the pair of glasses 2100 can further provide a viewfinder. The viewfinder can assist the user in directing the image sensor 2102 towards whenever the user desired to photograph. The viewfinder can be a separate apparatus that is extended by user action or can be a viewfinder that is visually present or presented on one of the lenses. In one example, the viewfinder can be an extendable viewer through which the user can look through to determine the field of reference of the image sensor 2102. The viewfinder can be extendible from either of the temples, such as in a telescoping, sliding or flipping action. Additionally, when the camera support arm 2106 is extended, a viewfinder can be automatically initiated. For example, indicators on one of the lens can be visually presented, such as through optical projection from one or more light sources. In another embodiment, the viewfinder can be always present, such as with indicators on one of the lens of the pair of glasses 2100. The indicators can be a few faint dots to define an area on the lens.

In one embodiment, the camera support arm (camera housing) 2106 is removably coupled to the hinge 2108. As such, the camera 2101 can be removed from or attached to the pair of glasses 2100. Indeed, the camera support arm (camera housing) 2106 can be a camera body that houses electronics for the camera 2101. In such case, the camera 2101 can operate as a camera apart from the pair of glasses 2100.

In one implementation, the camera support arm 2106 has a connector and the hinge 2108 has a counterpart connector. In one example, the connectors are peripheral bus connectors, such as USB connectors. In such case, the camera support arm 2106 can be attached and removed from the pair of glasses 2100. Such a connection via the connectors can be electrically functional or non-functional. If functional, electrical components in the pair of glasses 2100 can be electrically connected to electrical components in the camera 2101.

Still further, in one embodiment, the connector at the end of the hinge 2108 enables connection of a variety of different peripheral devices to the pair of glasses 2100. For example, the different peripheral devices (portable electronic devices) can be the camera, a memory card, or a media player. In one embodiment, electrical components integral with the pair of glasses 2100 can be shared by the different peripheral components. The hinge 2108 is not necessary in other embodiments, see FIGS. 8F-8H, where a connector is attached or integral with a temple of a pair of glasses. If desired, the camera 2101 or other peripheral devices can include in its structure a hinge or other mechanism to permit positioning the camera or other peripheral devices.

In still another embodiment, an angled or hinged adapter can be inserted between a connector attached to the pair of glasses 2100 and a connector of the camera 2101 or other peripheral devices. The adapter can be electrically functional or non-functional.

Regardless of the electrical components being utilized with the eyeglass frames, it may be desirable for the eyeglass frames to be substantially balanced in weight. In the event that electrical components are attached and/or at least partially embedded in one of the temples of the eyeglass frame, the other of the temples can include other electrical components or even a counter weight so that the eyeglass frame can be substantially balanced.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An eyeglass frame for supporting lenses therein, the eyeglass frame for a user, comprising:
   at least one temple, the temple having an inside surface, which is the surface facing the user when the frame is worn;
   a speaker at least partially embedded in the eyeglass frame;
   an electrical connector at least partially embedded on the inside surface of the at least one temple to receive a removable electronic device;
   an input mechanism that allows the user to enter a preference of the user to be stored in a storage medium at the frame; and
   an electrical conductor electrically coupling the speaker to the connector.

2. An eyeglass frame as recited in claim 1, wherein the speaker and the electrical conductor are at least partially embedded in the at least one temple.

3. An eyeglass frame as recited in claim 1 further comprising a tube, the tube extending from the speaker to guide sound generated by the speaker to one of the ears of the user.

4. An eyeglass frame as recited in claim 1, wherein the device is in the shape of a card.

5. An eyeglass frame as recited in claim 1, wherein the device is a memory card.

6. An eyeglass frame as recited in claim 1, wherein the frame further includes a cover, which is located over the removable electronic device after the removable electronic device is attached to the connector.

7. An eyeglass frame as recited in claim 1 wherein the user's preference is related to what is output by the speaker.

8. An eyeglass frame as recited in claim 1 wherein the shape of the removable electronic device is flat at least in the vicinity where it is attached to the connector.

9. An eyeglass frame as recited in claim 1,
   wherein a piece of asset can be identified by an attribute, and
   wherein the user indicates the preference regarding the piece of asset via the attribute.

10. An eyeglass frame as recited in claim 9,
    wherein the piece of asset is a piece of music, and
    wherein the attribute is selected from the group of the name of the singer of the piece of music, the name of the piece of music and the type of music that the piece of music belongs to.

11. An eyeglass frame as recited in claim 9,
    wherein the piece of asset includes meta data, and
    wherein the attribute is in the meta data.

12. An eyeglass frame as recited in claim 9,
    wherein the piece of asset is categorized based on the attribute, and
    wherein the categorization helps subsequent retrieval of the piece of asset.

13. An eyeglass frame as recited in claim 1,
    wherein the eyeglass frame further comprises voice recognition electronics, and
    wherein the preference is entered verbally via the voice recognition electronics.

14. An eyeglass frame for a user, comprising:
    a pair of temples, one on each side of the frame; and
    an electrical connector being located on an inside or an outside surface of the one of the temples,
    wherein the connector is for receiving a removable electronic device having a plurality of electrical components and a counterpart connector,
    wherein the connector and the counterpart connector operate to removably secure the electronic device to the eyeglass frame so that when secured the electronic device is substantially fixed in position relative to the eyeglass frame,
    wherein the eyeglass frame includes at least one electrical component internal to the one of the temples, and
    wherein the connector on the inside or the outside surface of the one of the temples is electrically connected to the at least one electrical component.

15. An eyeglass frame for a user comprising:
    a pair of temples, one on each side of the frame; and
    an electrical connector being located on an inside or an outside surface of the one of the temples,
    wherein the electrical connector is for receiving a removable electronic device having a plurality of electrical components and a counterpart connector,
    wherein the electrical connector and the counterpart connector operate to removably secure the electronic device to the eyeglass frame so that when secured the electronic device is substantially fixed in position relative to the eyeglass frame,
    wherein the eyeglass frame includes a functional module with a plurality of electrical components that are electrically interconnected through a substrate, and
    wherein the electrical connector on the inside or the outside surface of the one of the temples is electrically connected to the components through the substrate.

16. An eyeglass frame for supporting lenses therein, the eyeglass frame for a user, comprising:
    at least one temple, the temple having an inside and an outside surface;
    a speaker at least partially embedded in the eyeglass frame;
    an attachable and detachable storage medium located on the inside or the outside surface of the at least one temple;
    an input mechanism that allows the user to enter a preference of the user to be stored in the storage medium at the eyeglass frame; and an electrical conductor electrically coupling the speaker to the storage medium when the storage medium is attached to the eyeglass frame, wherein the information regarding the preference can be subsequently retrieved from the storage medium.

17. An eyeglass frame as recited in claim 16, wherein the eyeglass frame further comprises a wireless receiver that is configured to receive wireless signals, and wherein the preference is regarding the received wireless signals.

18. An eyeglass frame as recited in claim 17, wherein the received wireless signals pertain to a piece of music.

19. An eyeglass frame as recited in claim 18, wherein the piece of music is stored in the storage medium in view of the preference indicated by the user.

20. An eyeglass frame as recited in claim 16, wherein the eyeglass frame is configured to operate as a multimedia asset player.

21. An eyeglass frame as recited in claim 20, wherein the preference is regarding an attribute of the multimedia asset player.

22. An eyeglass frame as recited in claim 16, wherein the eyeglass frame further comprises a wireless transmitter that is configured to wirelessly transmit information regarding the preference to another entity to allow the other entity to track the preference of the user.

23. An eyeglass frame as recited in claim 16, wherein the eyeglass frame is configured to play a piece of music, and wherein the preference identifies the piece of music.

24. An eyeglass frame as recited in claim 23, wherein in view of the preference, the piece of music is stored in the storage medium to allow the user to subsequently retrieve the piece of music.

25. An eyeglass frame as recited in claim 24, wherein the storage medium is a flash memory.

\* \* \* \* \*

UNITED STATES PATENT AND TRADEMARK OFFICE
CERTIFICATE OF CORRECTION

PATENT NO. : 7,500,747 B1   Page 1 of 1
APPLICATION NO. : 11/183256
DATED : March 10, 2009
INVENTOR(S) : Howell et al.

It is certified that error appears in the above-identified patent and that said Letters Patent is hereby corrected as shown below:

ON THE TITLE PAGE:

On Page 1, under section (63) "Continuation of application" should be

--Continuation-in-part of application--

On page 3, Item (56), OTHER PUBLICATIONS,

Please delete ""Sharper Image -The FM Pedometer", e-Compounds Gifts.com"

Should be --"Sharper Image -The FM Pedometer", e-Corporate Gifts.com--

"Niwa," should be --NIWA,--

Please delete "PNY Announces Executive Attaché USB 2.0 Flash Drive and Pan" should be --PNY Announces Executive Attaché USB 2.0 Flash Drive and Pen--

Signed and Sealed this

Thirteenth Day of October, 2009

David J. Kappos
*Director of the United States Patent and Trademark Office*